(12) United States Patent
Williams et al.

(10) Patent No.: US 7,278,946 B2
(45) Date of Patent: *Oct. 9, 2007

(54) POWER TRANSFER DEVICE WITH OVERRUNNING MODE CLUTCH

(75) Inventors: Randolph C. Williams, Weedsport, NY (US); Richard H. Williams, Bay City, MI (US); Aaron Ronk, Lake George, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/363,145

(22) Filed: Feb. 27, 2006

(65) Prior Publication Data

US 2006/0142109 A1 Jun. 29, 2006

Related U.S. Application Data

(63) Continuation of application No. 10/812,382, filed on Mar. 29, 2004, now Pat. No. 7,004,875.

(51) Int. Cl.
*F16D 11/16* (2006.01)

(52) U.S. Cl. .......................... 475/198; 192/38; 192/47

(58) Field of Classification Search .................. 192/36, 192/38, 47, 84.6, 48.2; 475/198, 204
See application file for complete search history.

(56) References Cited

U.S. PATENT DOCUMENTS

| | | | |
|---|---|---|---|
| 4,098,379 A | 7/1978 | Fogelberg et al. | 192/38 |
| 4,770,280 A | 9/1988 | Frost | 192/53.343 |
| 4,874,056 A | 10/1989 | Naito | 180/233 |
| 5,078,660 A | 1/1992 | Williams et al. | 475/84 |
| 5,284,068 A | 2/1994 | Frost | 74/665 GA |
| 5,323,871 A | 6/1994 | Wilson et al. | 180/197 |
| 5,346,442 A | 9/1994 | Eastman | 475/223 |
| 5,363,938 A | 11/1994 | Wilson et al. | 180/233 |
| 5,407,024 A | 4/1995 | Watson et al. | 180/248 |
| 5,411,447 A | 5/1995 | Frost | 475/223 |
| 5,582,263 A | 12/1996 | Varma et al. | 180/247 |
| 5,651,749 A | 7/1997 | Wilson et al. | 475/221 |
| 5,655,986 A | 8/1997 | Wilson et al. | 475/204 |
| 5,697,861 A | 12/1997 | Wilson | 475/198 |
| 5,700,222 A | 12/1997 | Bowen | 475/204 |
| 5,702,321 A | 12/1997 | Bakowski et al. | 475/199 |
| 5,704,863 A | 1/1998 | Zalewski et al. | 475/88 |
| 5,704,867 A | 1/1998 | Bowen | 475/221 |

(Continued)

*Primary Examiner*—Sherry Estremsky
(74) *Attorney, Agent, or Firm*—Harness, Dickey & Pierce, P.L.C.

(57) ABSTRACT

A controllable, multi-mode, bi-directional overrunning mode clutch and a shift system adapted for use in a power transfer assembly for transferring drive torque from a primary driveline to a secondary driveline so as to establish a four-wheel drive mode. The mode clutch includes a first ring journalled on a first rotary member, a second ring fixed to a second rotary member, and a plurality of rollers disposed in opposed cam tracks formed between the first and second rings. The first ring is split to define an actuation channel between its end segments. A cam member is moveable between positions engaged with and released from one or both end segments of the split first ring. The shift system includes a mode fork which controls movement of the cam member for establishing a two-wheel drive mode in addition to on-demand and locked four-wheel drive modes.

31 Claims, 18 Drawing Sheets

U.S. PATENT DOCUMENTS

| | | | |
|---|---|---|---|
| 5,836,847 A | 11/1998 | Pritchard | 475/204 |
| 5,884,526 A | 3/1999 | Fogelberg | 74/335 |
| 5,902,205 A | 5/1999 | Williams | 475/204 |
| 5,924,510 A | 7/1999 | Itoh et al. | 180/197 |
| 5,947,858 A | 9/1999 | Williams | 475/206 |
| 5,951,428 A | 9/1999 | Itoh et al. | 475/204 |
| 5,951,429 A | 9/1999 | Eastman | 475/204 |
| 5,992,592 A | 11/1999 | Showalter | 192/43.1 |
| 5,993,592 A | 11/1999 | Perego | 156/292 |
| 6,022,289 A | 2/2000 | Francis | 475/320 |
| 6,056,666 A | 5/2000 | Williams | 475/320 |
| 6,062,361 A | 5/2000 | Showalter | 192/38 |
| 6,092,635 A | 7/2000 | McCarthy et al. | 192/45 |
| 6,113,512 A | 9/2000 | Williams | 475/204 |
| 6,123,183 A | 9/2000 | Ito et al. | 192/220 |
| 6,132,332 A | 10/2000 | Yasui | 477/36 |
| 6,152,848 A | 11/2000 | Williams et al. | 475/204 |
| 6,283,887 B1 | 9/2001 | Brown et al. | 475/204 |
| 6,409,000 B1 | 6/2002 | Ioth et al. | 192/39 |
| 6,409,001 B1 | 6/2002 | Kerr | 192/44 |
| 6,484,857 B2 * | 11/2002 | Vonnegut et al. | 192/35 |
| 6,579,203 B2 | 6/2003 | Wang et al. | 475/162 |
| 6,579,205 B2 | 6/2003 | Williams | 475/204 |
| 6,602,159 B1 | 8/2003 | Williams | 475/303 |
| 6,629,474 B2 | 10/2003 | Williams | 74/665 G |
| 6,652,407 B2 | 11/2003 | Ronk et al. | 475/204 |
| 6,805,652 B2 | 10/2004 | Williams | 475/223 |
| 6,814,201 B2 | 11/2004 | Thomas | 192/43.1 |
| 6,821,227 B2 | 11/2004 | Williams | 475/204 |
| 6,846,262 B2 | 1/2005 | Williams et al. | 475/204 |
| 6,862,953 B2 | 3/2005 | Fitzgerald et al. | 74/665 G |
| 7,004,875 B2 * | 2/2006 | Williams et al. | 475/198 |
| 2002/0029948 A1 | 3/2002 | Williams | 192/72 |
| 2002/0042318 A1 * | 4/2002 | Brown et al. | 475/204 |
| 2002/0157890 A1 | 10/2002 | Williams | 180/249 |
| 2003/0051959 A1 | 3/2003 | Blair | 192/21 |

* cited by examiner

POWER TRANSFER DEVICE WITH OVERRUNNING MODE CLUTCH

CROSS-REFERENCE TO RELATED APPLICATIONS

This application is a continuation of U.S. patent application Ser. No. 10/812,382 filed Mar. 29, 2004, now U.S. Pat. No. 7,004,875.

FIELD OF THE INVENTION

The present invention relates generally to bi-directional overrunning clutch assemblies and, more particularly, to an actively-controlled, multi-mode, bi-directional overrunning clutch assembly used in a four-wheel drive power transfer device.

BACKGROUND OF THE INVENTION

Four-wheel and all-wheel drive vehicles are in great demand due to the enhanced traction control they provide. In many such vehicles, a power transfer device, such as a transfer case or a power take-off unit, is installed in the drivetrain and is normally operable to deliver drive torque to the primary driveline for establishing a two-wheel drive mode. The power transfer device is further equipped with a clutch assembly that can be selectively or automatically actuated to transfer drive torque to the secondary driveline for establishing a four-wheel drive mode. These "mode" clutch assemblies can range from a simple dog clutch that is operable for mechanically shifting between the two-wheel drive mode and a "locked" (i.e., part-time) four-wheel drive mode to a more sophisticated automatically-actuated multi-plate clutch for providing an "on-demand" four-wheel drive mode.

On-demand four-wheel drive systems are able to provide enhanced traction and stability control and improved operator convenience since the drive torque is transferred to the secondary driveline automatically in response to lost traction of the primary driveline. An example of passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled on-demand clutch control systems, recent efforts have been directed to the use of overrunning clutches that can be controlled to provide various operating modes. For example, U.S. Pat. No. 5,993,592 illustrates a pawl-type controllable overrunning clutch assembly installed in a transfer case and which can be shifted between various drive modes. U.S. Pat. No. 6,092,635 discloses a hydraulically-actuated multi-function controllable overrunning clutch assembly that is noted to be operable for use in vehicular power transmission mechanisms. In addition, commonly owned U.S. Pat. Nos. 6,557,680, 6,579,203, 6,602,159 and 6,652,407 each disclose a controllable overrunning clutch installed in a transfer case which can be shifted by a motor-driven shift system to establish on-demand and part-time four-wheel drive modes. Likewise, U.S. Pat. Nos. 5,924,510, 5,951,428, 6,123,183, and 6,132,332 each disclose a controllable multi-mode overrunning clutch installed in a transfer case which is selectively shifted using an electromagnetic clutch.

While several versions of the actively-controlled multi-mode overrunning clutches mentioned above are well-suited for use in power transfer devices, an additional need to provide a two-wheel drive mode is, in most four-wheel drive vehicular applications, required to address fuel economy concerns and permit interaction with anti-lock braking and/or electronic stability control systems. Accordingly, a need exists to continue development of controllable bi-directional overrunning clutches which provide robust operation and reduced packaging size.

SUMMARY OF THE INVENTION

The present invention is directed to a controllable, multi-mode, bi-directional overrunning mode clutch assembly and a shift system adapted for use in a power transfer device for transferring drive torque from a primary output shaft to a secondary output shaft so as to establish a four-wheel drive mode. The clutch assembly includes a first ring fixed for rotation with a first rotary member, a second ring concentrically disposed between the first ring and a second rotary member, and a plurality of rollers disposed in opposed cam tracks formed between the first and second rings. The first rotary member is driven by the first output shaft while the second rotary member is operable to drive the second output shaft. The second ring is split to define an actuation channel having a pair of spaced end segments. An actuator ring is moveable between positions engaged with and released from the end segments of the second ring. The shift system includes a mode shift mechanism that is operable in a first mode position to permit the actuator ring to engage one of the end segments of the second ring so as to establish an on-demand four-wheel drive mode. Further, the mode shift mechanism is operable in a second mode position to inhibit the actuator ring from engaging either of the end segments of the second ring so as to establish a locked four-wheel drive mode. Finally, the mode shift mechanism is operable in a third mode position to cause the actuator ring to engage both end segments of the second ring so as to establish a two-wheel drive mode.

The power transfer device of the present invention can also include a two-speed gearset and a range shift mechanism for establishing high and low-range drive connections. In such two-speed devices, the shift system also functions to coordinate movement of the mode shift mechanism and the range shift mechanism to establish various combinations of speed ranges and drive modes.

Thus, it is an object of the present invention to provide a power transfer device equipped with a controllable, multi-mode, bi-directional overrunning clutch that advances the state of the four-wheel drive technology.

It is a further object of the present invention to provide a power-operated actuator for shifting the mode clutch assembly between its distinct modes in response to mode signals received by a control unit.

Further objects, advantages and features of the present invention will become readily apparent to those skilled in the art by studying the following description of the preferred embodiment in conjunction with the appended drawings which are intended to set forth the best mode currently contemplated for carrying out the present invention.

DETAILED DESCRIPTION OF THE PREFERRED EMBODIMENTS

Figure 1:
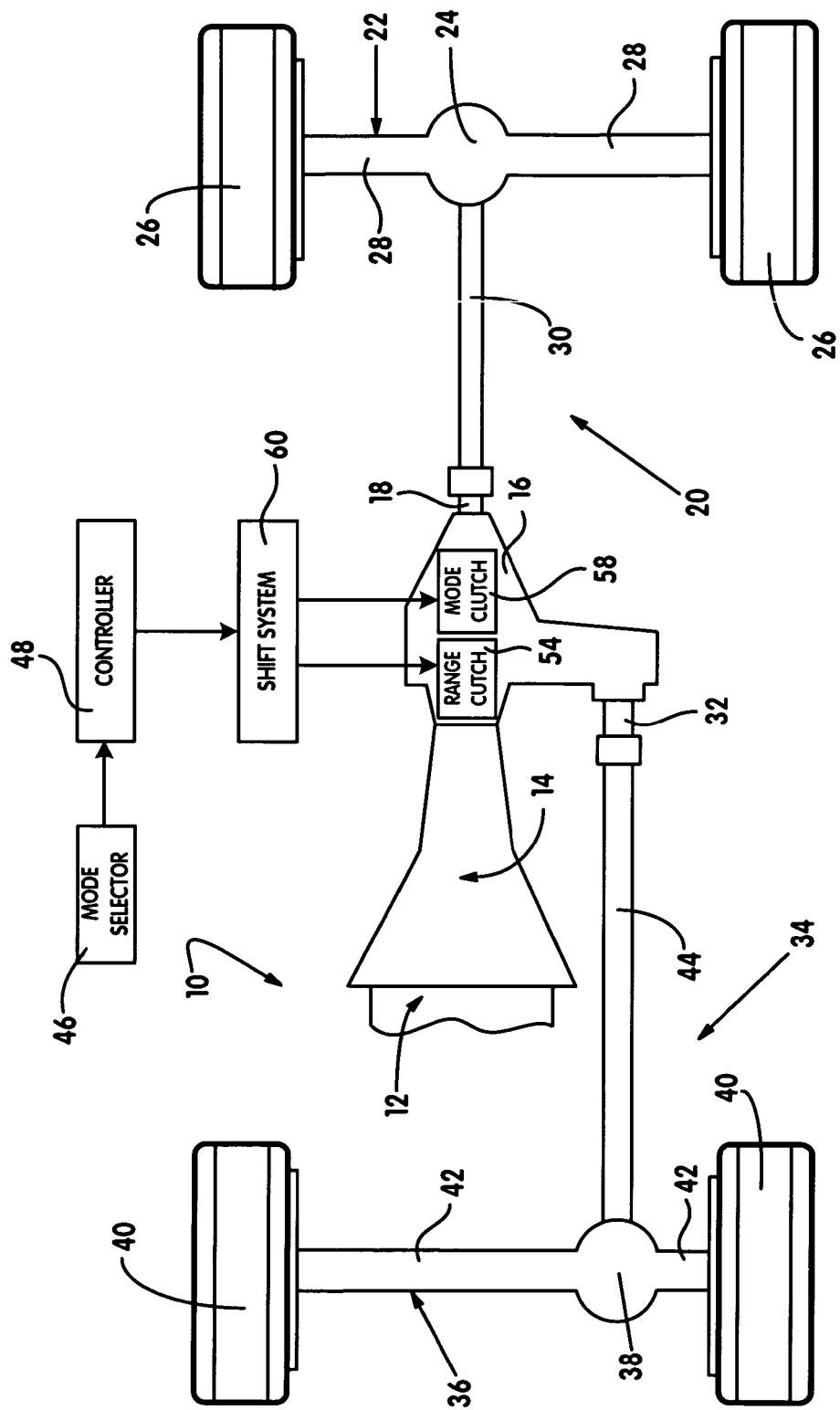
FIG. 1 is a schematic view of a four-wheel drive motor vehicle equipped with a transfer case constructed according to the present invention.

Referring now to FIG. 1, a power transfer system 10 for a four-wheel drive motor vehicle is shown to include a power source, such as engine 12, which drives a conventional transmission 14 of either the manually or automatically shifted type. The output shaft of transmission 14 drives an input member of a power transfer device, hereinafter referred to as transfer case 16, which, in turn, delivers drive torque to a primary output shaft 18 that is operably connected to a primary driveline 20. Primary driveline 20 includes an axle assembly 22 having a differential 24 driving a first pair of wheel assemblies 26 via axleshafts 28, and a drive shaft 30 connected between primary output shaft 18 and differential 24. Transfer case 16 further includes a secondary output shaft 32 that is operably connected to a secondary driveline 34. Secondary driveline 34 includes an axle assembly 36 having a differential 38 driving a second pair of wheel assemblies 40 via axleshafts 42, and a drive shaft 44 connected between secondary output shaft 32 and differential 38.

Power transfer system 10 also includes an electronic controller 48 which receives mode signals from a mode selector 46. Controller 48 receives the mode signals and generates control signals that are used to actuate a controllable shift system associated with transfer case 16. According to the arrangement shown, primary driveline 20 is the rear driveline of a rear wheel drive vehicle while secondary driveline 34 is its front driveline. However, it will be understood that the teachings of the present invention could easily be adapted for use in a front wheel drive vehicle in which the front driveline would be designated as the primary driveline.

Figure 2:
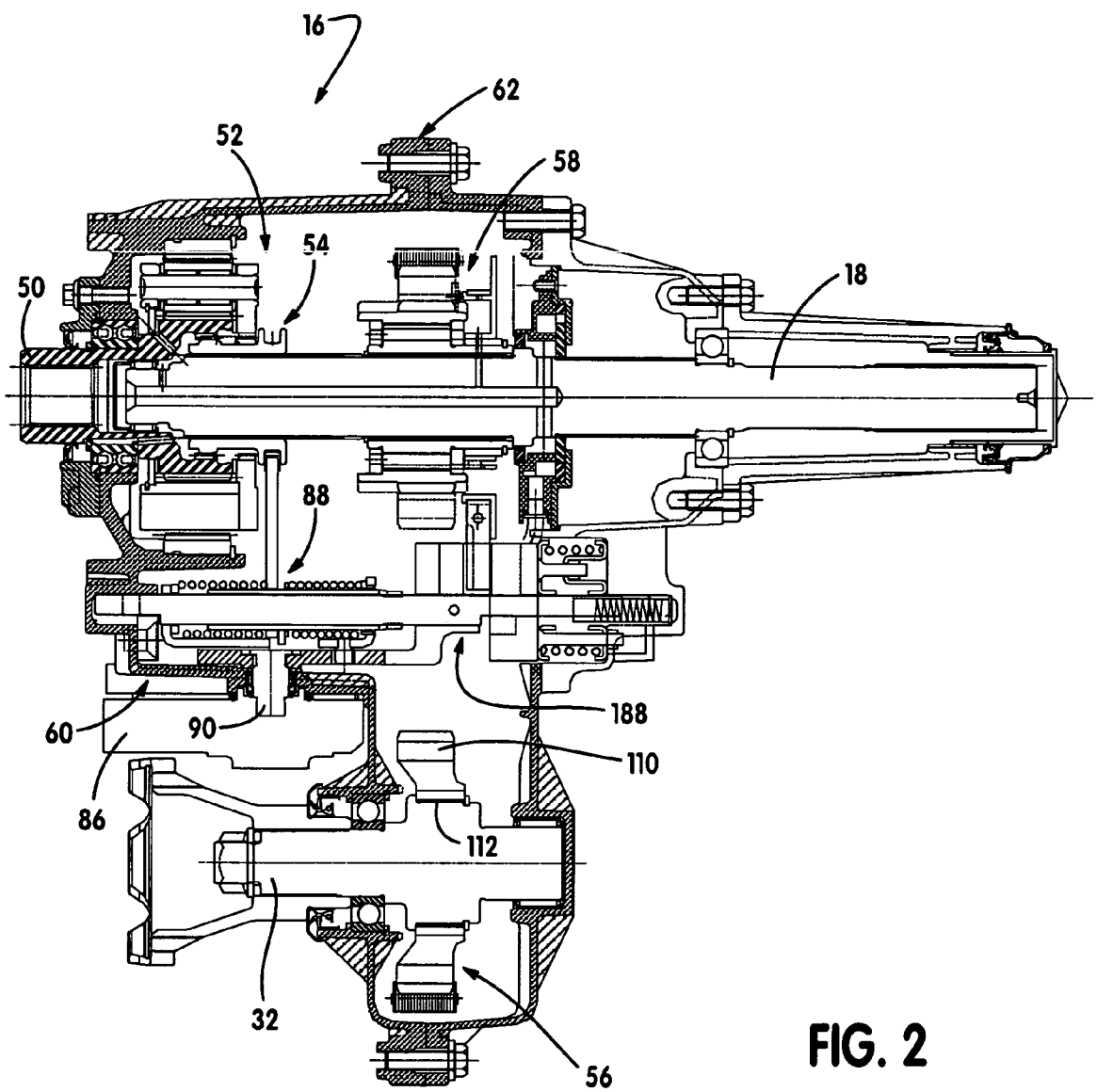
FIG. 2 is a sectional view of the transfer case equipped with a two-speed reduction unit, a bi-directional overrunning mode clutch assembly and a shift system according to the present invention.
Figure 3:
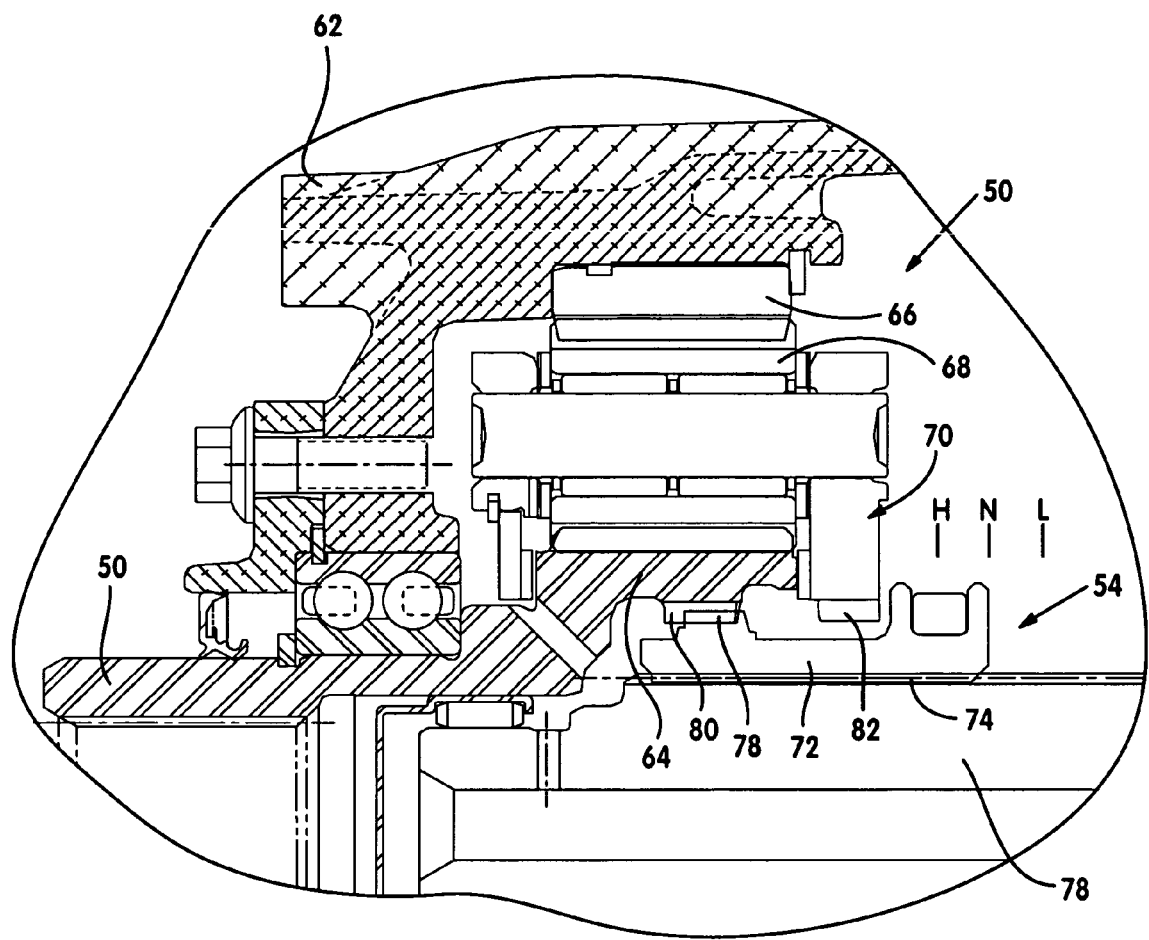
FIG. 3 is an enlarged sectional view showing the components of the two-speed reduction unit in greater detail.

Referring primarily to FIG. 2, transfer case 16 is shown to generally include an input shaft 50, rear output shaft 18, a planetary reduction gearset 52, a range clutch 54, front output shaft 32, a transfer assembly 56, a bi-directional mode clutch assembly 58, and a power-operated shift system 60, all of which are enclosed within or mounted to a multi-piece housing assembly 62. Input shaft 50 is adapted for direct connection to the output shaft of transmission 14. Planetary gearset 52 includes a sun gear 64 fixed for rotation with input shaft 50, a ring gear 66 non-rotatably fixed to housing assembly 62, and a plurality of planet gears 68 rotatably supported on a planet carrier 70. Range clutch 54 includes a range collar 72 that is fixed via a splined connection 74 for rotation with and axial bi-directional movement on rear output shaft 18. Range collar 72 is moveable between a high-range (H) position, a neutral (N) position, and a low-range (L) position via axial translation of a range fork 76. In the H position, clutch teeth 78 on range collar 72 engage internal clutch teeth 80 on input shaft 50 so as to establish a direct ratio drive connection between input shaft 50 and rear output shaft 18. In the L position, clutch teeth 78 on range collar 72 engage internal clutch teeth 82 on planet carrier 70 so as to establish a reduction ratio drive connection such that rear output shaft 18 is driven at a reduced speed ratio relative to rear output shaft 18. In the N position, range collar 72 is disengaged from coupled engagement with both input shaft 50 and planet carrier 70 such that no drive torque is transmitted from input shaft 50 to rear output shaft 18.

The position of range collar 72 and range fork 76 are controlled by a range shift mechanism 84 and an electrically-powered actuator, such as an electric motor/encoder assembly 86 and sector plate 88, that are associated with shift system 60. In operation, sector plate 88 is rotated by an output shaft 90 of motor assembly 86. Such rotation of sector plate 88 controls actuation of range shift mechanism 88 for moving range collar 72 between its three distinct range positions. More specifically, sector plate 88 has a contoured range slot 92 within which a roller-type range follower 94 is retained. Range follower 94 is fixed to a shift bracket 96 which, in turn, is retained for sliding movement on a shift rail 98 that is supported for sliding movement relative to housing assembly 62. Range fork 76 has a C-shaped end section retained in an annular groove formed in range collar 72. A pair of biasing springs 100 surround shift rail 98 and its opposite ends engage lugs 102 and 104 on bracket 96 and opposite sides of range fork 76. As will be detailed, the contour of range slot 92 is configured to axially translate shift bracket 96 on shift rail 98 in response to rotation of sector plate 88. Springs 100 function as resilient energy storage couplings between bracket 96 and range fork 76 that allows rapid and smooth engagement of clutch teeth 78 on range collar 72 with the clutch teeth 80 on input shaft 50 or clutch teeth 82 on planet carrier 70 after a "block out" condition has been eliminated to complete the selected range shift.

It will be appreciated that planetary reduction gearset 52, range collar 72, range fork 76 and its corresponding connection to sector plate 88 via range shift mechanism 84, which function to provide a two-speed (i.e., high-range and low-range) capability to transfer case 16, are optional such that transfer case 16 could be functional as a one-speed direct drive unit equipped only with mode clutch assembly 58. Moreover, the non-synchronized range shift system disclosed could alternatively be replaced with a synchronized range shift system to permit "on-the-move" shifting between high and low-range without the need to stop the vehicle. Commonly-owned U.S. Pat. Nos. 5,911,644, 5,957,429, and 6,056,666 disclose synchronized range shaft systems that are readily adapted for use with transfer case 16 and which are hereby incorporated by reference.

Transfer assembly 56 is shown to include a first sprocket 110 fixed via a spline connection 112 to front output shaft 32, a second sprocket 114 rotatably mounted to surround rear output shaft 18, and a power chain 116 meshed with both sprockets 110 and 114. Mode clutch assembly 58 is provided for selectively coupling second sprocket 114 to rear output shaft 18 for transferring drive torque from rear output shaft 18 through transfer assembly 56 to front output shaft 32. Clutch assembly 58 is a controllable, multi-mode, bi-directional overrunning clutch installed between second sprocket 114 and rear output shaft 18. Clutch assembly 58 generally includes a first ring 118, a second ring 120, rollers 122 disposed between the first and second rings, a friction sleeve 124, and front and rear support bushings 126 and 128, respectively.

First ring, hereinafter referred to as inner hub 118, is fixed via a spline connection 130 for common rotation with rear output shaft 18 and has a series of longitudinally-extending arcuate cam tracks 132 formed circumferentially in an outer surface of a raised race segment 134. Second ring, hereinafter referred to as slipper ring 120, has a cylindrical outer surface 136 and a series of longitudinally-extending arcuate cam tracks 138 formed circumferentially in its inner surface. Slipper ring 120 is a split ring having a full length longitudinally-extending slit 140 and further includes a rim segment 142 which terminates in an actuation slot 144 defining first and second edge surfaces 146 and 148, respectively. Rollers 122 are cylindrical and are disposed between aligned pairs of cam tracks 132 and 138. As seen, friction sleeve 124 is disposed between outer cylindrical surface 136 of slipper ring 120 and an inner cylindrical surface 150 formed on a hub segment 152 of second sprocket 114. Friction sleeve 124 is preferably made of a carbon fiber material and functions to eliminate metal-to-metal engagement between sprocket 114 and slipper ring 120 while assisting in frictionally clamping slipper ring 120 to hub segment 152 of second sprocket 114 when mode clutch assembly 58 is locked. If an axle disconnect system is used to disconnect front propshaft 44 from front axle assembly 36 during two-wheel drive operation, friction sleeve 124 further acts as a speed synchronizing device.

Figure 4:
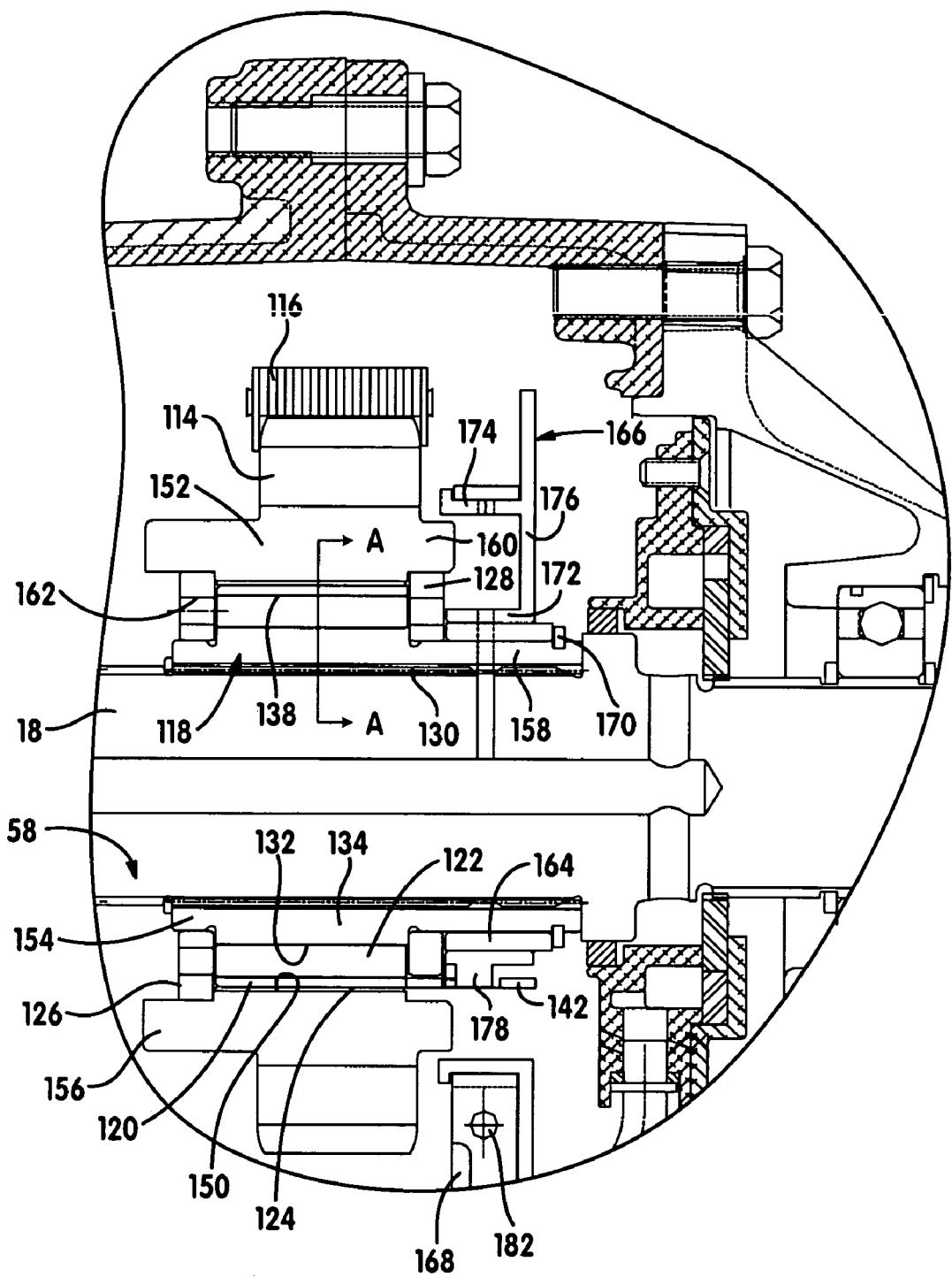
FIG. 4 is an enlarged sectional view showing the components of the overrunning mode clutch assembly.
Figure 5:
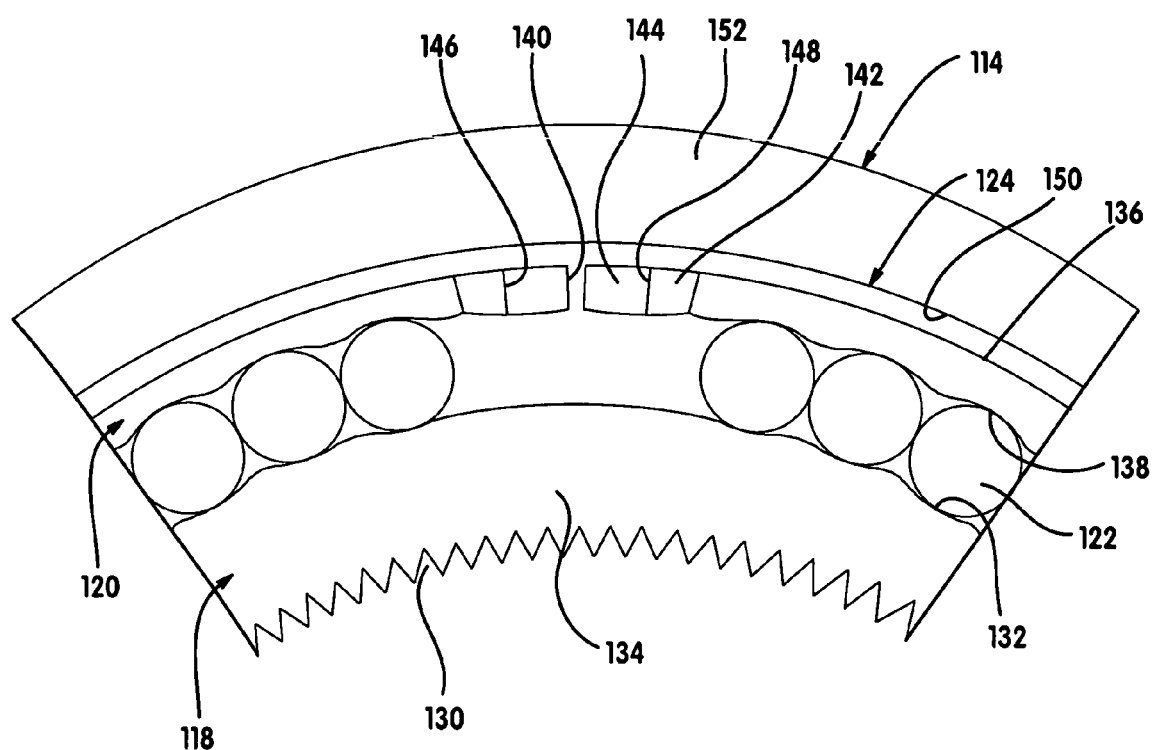
FIG. 5 is a sectional view, taken along line A-A of FIG. 4, of the components associated with the mode clutch assembly.

As best seen from FIG. 4, front support bushing 126 is located between a front support rim 154 on inner hub 118 and a front support rim 156 on second sprocket 114. Likewise, rear support bushing 128 is located between a rear support rim 158 on inner hub 118 and a rear support rim 160 on second sprocket 114. Preferably, front support bushing 126 and rear support bushing 128 are made of brass and are arranged such that front support bushing 126 is in press-fit engagement with second sprocket 114 while rear support bushing 128 is in press-fit engagement with inner hub 118. The support bushings function to maintain the radial clearances between inner hub 118 and hub segment 152 of sprocket 114 to provide improved on-off engagement of rollers 122 with cam tracks 132 and 138. As such, support bushings 126 and 128 function to support second sprocket 114 for rotation relative to inner hub 118 and also function to enclose and retain rollers 122 between hub segment 152 of second sprocket 114 and race segment 134 of inner hub 118. A series of holes 162 are provided in both support bushings 126 and 128 to permit lubrication of rollers 122. In addition, rear support bushing 128 has a recessed slot segment through which rim segment 142 of slipper ring 120 extends.

Mode clutch assembly 58 further includes an actuator support sleeve 164, an actuator ring 166 and a drag band 168. Support sleeve 164 is journalled on rear support rim 158 of inner hub 118 and is retained thereon via a snap ring 170. Actuator ring 166 includes an inner cylindrical rim 172 and an outer cylindrical rim 174 interconnected by a plurality of radial web segments 176. Inner cylindrical rim 172 is supported on support sleeve 164 while drag band 168 encircles outer rim 174. As will be detailed, actuator ring 166 is adapted to move axially on support sleeve 164 between first and second positions. A radial actuator lug 178 extends outwardly from inner rim 172 between a pair of adjacent web segments 176 and is located within actuation slot 144 of slipper ring 120. Drag band 168 has a pair of ends 180A and 180B that are interconnected by a spring-biased roll pin 182 that ensures that drag band 168 normally maintains a predetermined frictional drag force on outer rim 174 of actuator ring 166.

Figure 6:
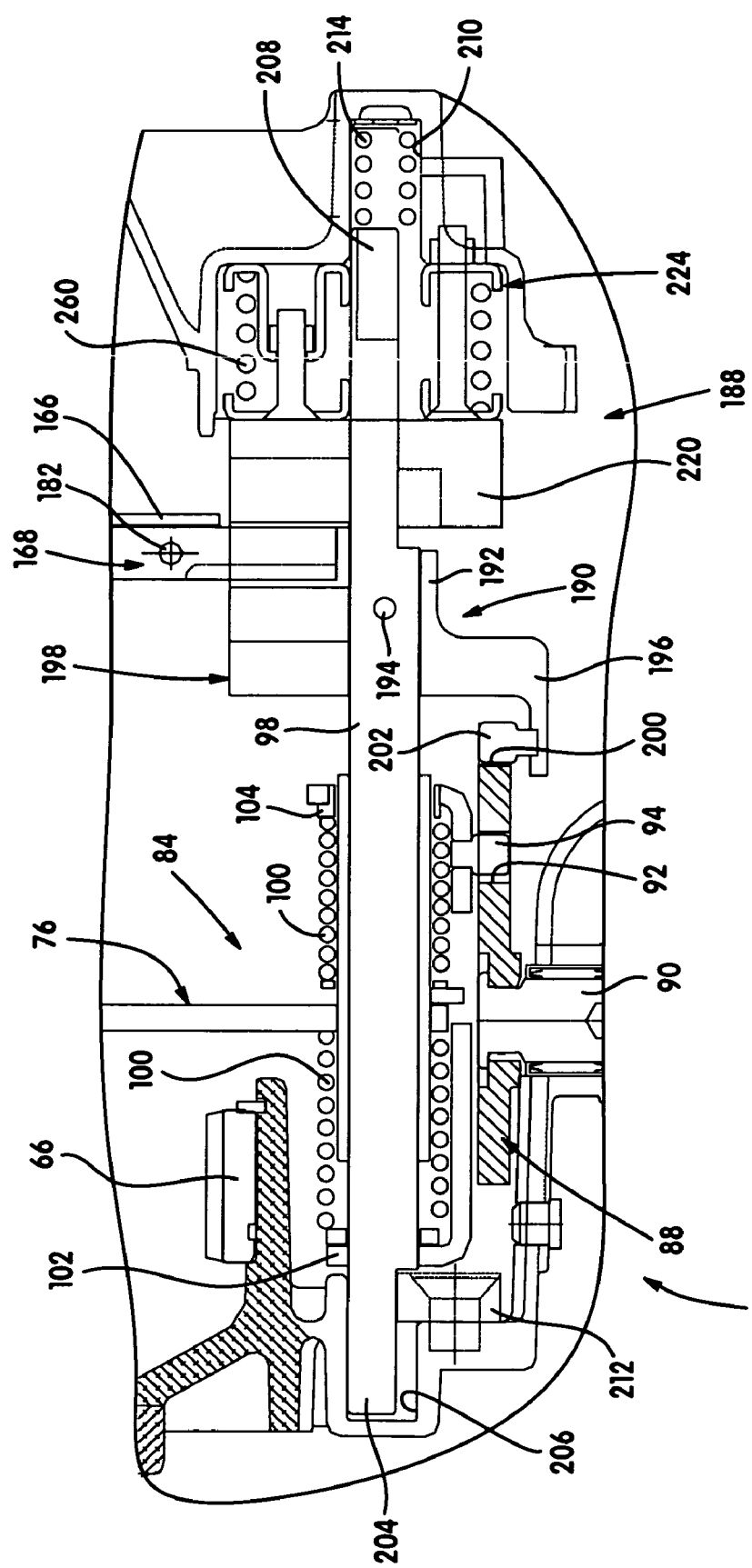
FIG. 6 is an enlarged partial view of the transfer case showing various components of the shift system.

Mode clutch assembly 58 is controlled by power-operated shift system 60 in response to the mode signal sent to controller 48 by mode selector 46. As will be detailed, sector plate 88 is rotated by electric motor assembly 86 to move a mode fork 190 associated with a mode shift mechanism 188 between three distinct mode positions for shifting mode clutch assembly 58 between an on-demand four-wheel drive mode, a locked four-wheel drive mode, and a two-wheel drive mode. Mode fork 190 includes a hub segment 192 fixed via a retaining pin 194 for movement with shift rail 98, a follower segment 196, and a cam segment 198. A mode follower 200 is secured to follower segment 196 and is in rolling contact with a mode cam surface 202 formed on a peripheral edge of sector plate 88. As will be detailed, the contour of cam surface 202 functions to cause translational movement of mode fork 190 between its three distinct mode positions in response to rotation of sector plate 88. As best seen from FIG. 6, shift rail 98 has a first end segment 204 retained in a first socket 206 formed in housing 62 while its second end segment 208 is retained in a second socket 210. Both end segments of shift rail 98 are partially cylindrical (i.e., D-shaped) with a retainer block 212 functioning to prevent rotation of shift rail 98 relative to housing 62. Also, a biasing spring 214 engages second end segment 208 for normally biasing shift rail 98 in a first direction (i.e., to the left in FIG. 6) so as to maintain engagement of mode follower 200 on mode fork 190 with cam surface 202 of sector plate 88. Cam segment 198 of mode fork 190 is disposed between ends 180A and 180B of drag band 168.

Figure 8A:
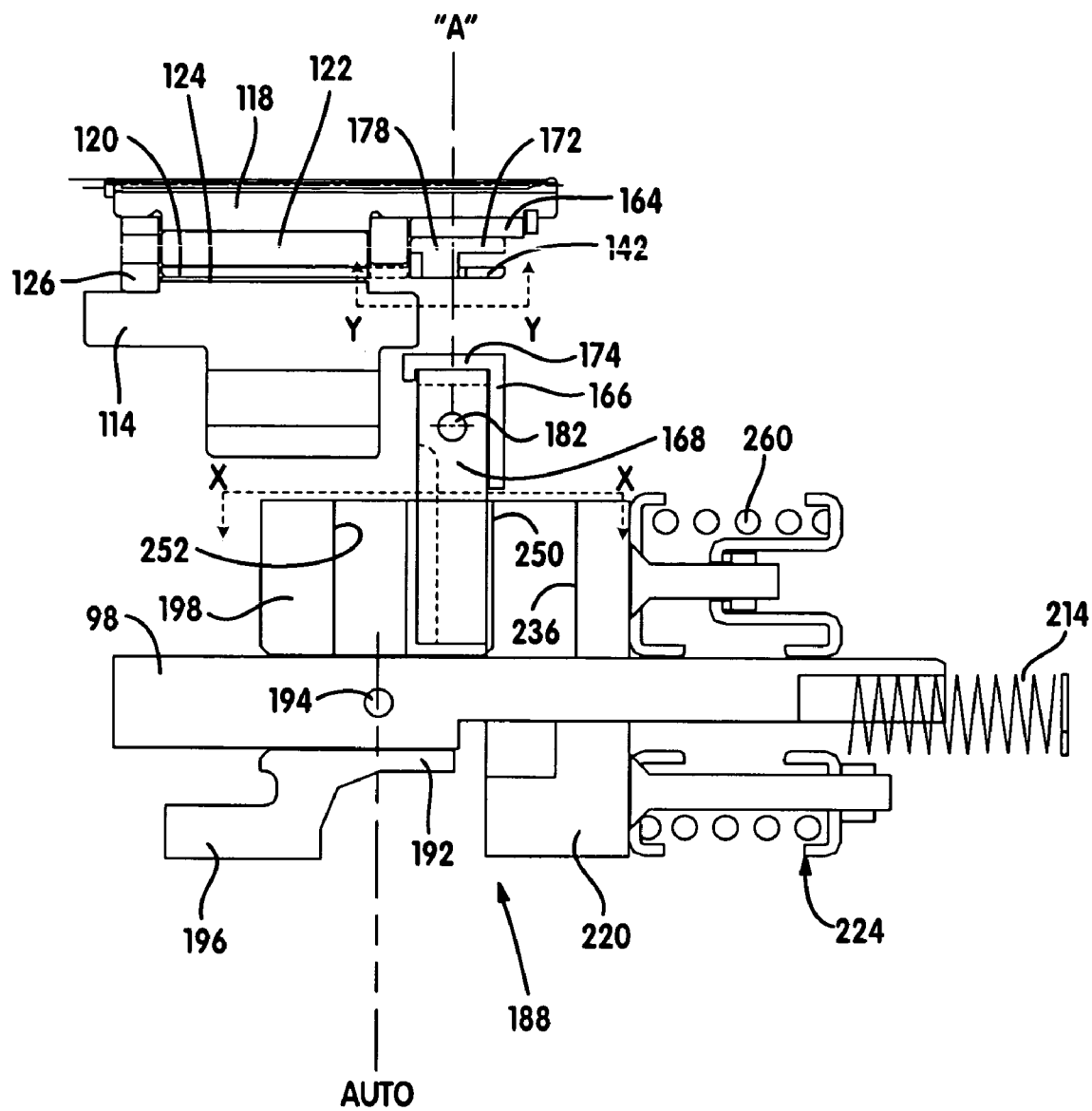
FIG. 8A shows components of the mode clutch assembly and the mode shift mechanism positioned to establish an on-demand four-wheel drive mode.

Mode shift mechanism 188 also includes a support plate 220 having an aperture 222 supporting a portion of second end segment 208 of shift rail 98, and a biasing assembly 224 disposed between a rear face surface 226 of support plate 220 and a ground surface 228 of housing 62. Biasing assembly 224 is operable to cause a front face surface 232 of support plate 220 to engage first or rear edge surfaces 230A and 230B of drag band ends 180A and 180B, respectively. As such, actuator ring 166 is biased in a first direction by biasing assembly 224 toward a first position, as denoted by position line "A" in FIGS. 8A and 8B. In addition, support plate 220 defines a stepped aperture 234 having an upper shoulder surface 236 and a lower shoulder surface 238. Cam segment 198 of mode fork 190 is shown to include a first cam block 240, a second cam block 242, a third cam block 244 interconnecting first cam block 240 and second cam block 244, and a drive block 246. As will be detailed, movement of mode fork 190 is operable to cause cam segment 198 to move between ends 180A and 180B of drag band 168 for resiliently moving ends 180A and 180B between first and second positions.

According to a preferred embodiment of the present invention, sector plate 88 may be rotated to any one of five distinct sector positions to establish a corresponding number of drive modes. These drive modes include an on-demand four-wheel high-range drive mode, a locked four-wheel high-range drive mode, a two-wheel high-range drive mode, a neutral mode, and a locked four-wheel low-range drive mode. The particular four-wheel drive mode selected is established by the position of mode fork 190 and range fork 76. In operation, the vehicle operator selects a desired drive mode via actuation of mode selector 46 which, in turn, sends a mode signal to controller 48 that is indicative of the particular drive mode selected. Thereafter, controller 48 generates an electric control signal that is applied to motor assembly 86 for controlling the rotated position of sector plate 88.

Mode selector 46 can take the form of any mode selector device which is under the control of the vehicle operator for generating a mode signal indicative of the specific mode selected. In one form, the mode selector device may be in an array of dash-mounted push button switches. Alternatively, the mode selector may be a manually-operable shift lever sequentially moveable between a plurality of positions corresponding to the available operational modes which, in conjunction with a suitable electrical switch arrangement, generates a mode signal indicating the selected mode. In either form, mode sector 46 offers the vehicle operator the option of deliberately choosing between the various operative drive modes.

Figure 7:
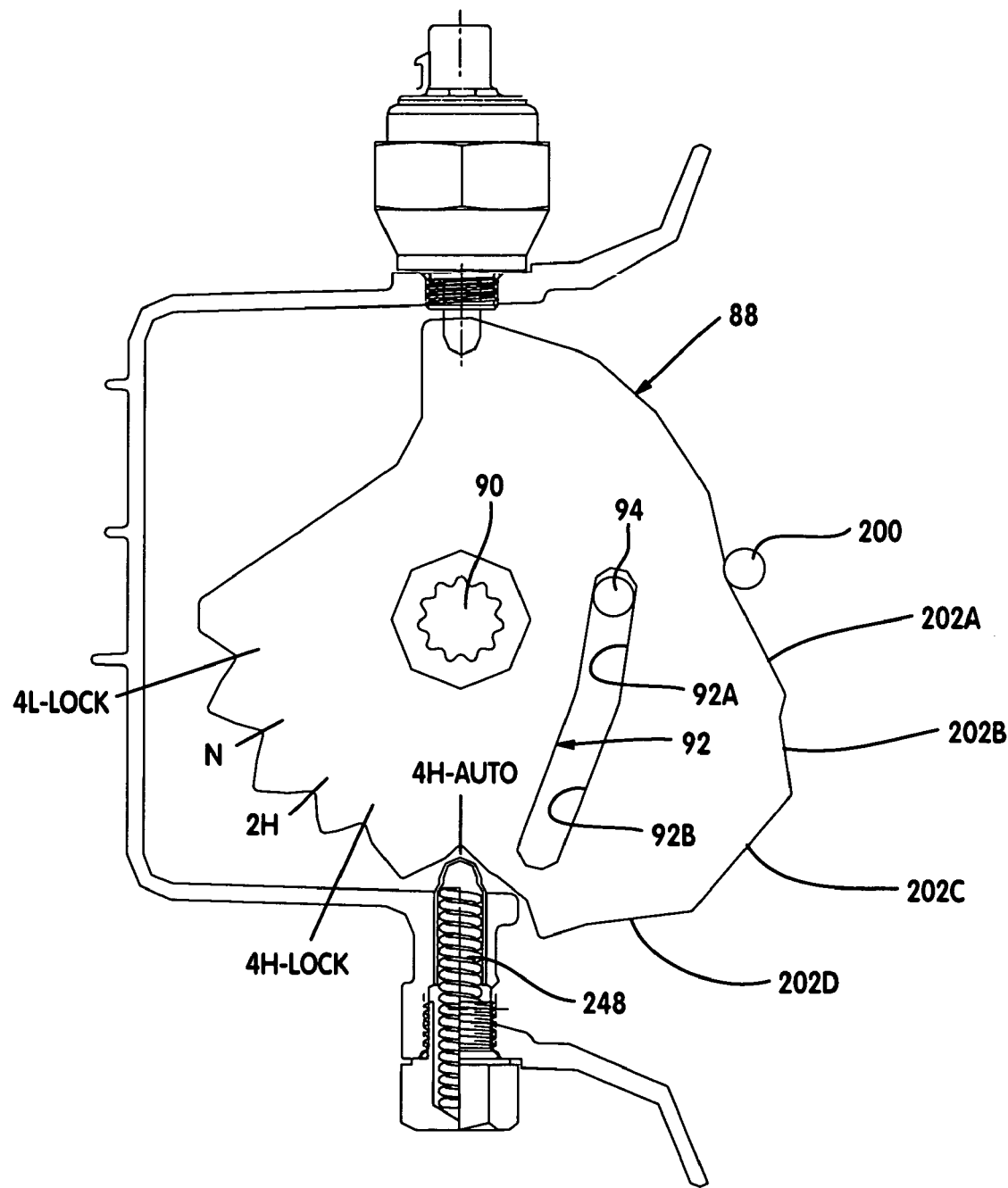
FIG. 7 is a side view of the sector plate associated with the shift system shown in FIG. 6.

Referring to FIG. 7, sector plate 88 is shown to have five distinct detent positions labeled 4H-AUTO, 4H-LOCK, 2H, N and 4L-LOCK. Each detent position corresponds to an available drive mode that can be selected via mode selector 46. In particular, FIG. 7 illustrates a poppet assembly 248 retained in the 4H-AUTO detent of sector plate 88 which represents establishment of the on-demand four-wheel high-range drive mode wherein range collar 72 is located in its H position and mode fork 190 is located in its first or AUTO mode position. In particular, range follower 94 is located in a high-range dwell segment 92A of cam slot 92 while mode follower 200 engages a first ramped portion 202A of cam surface 202. With mode fork 190 located in its AUTO mode position (see FIGS. 6 and 8A), ends 180A and 180B of drag band 168 engage the side surfaces of first cam block 240.

Figure 9A:
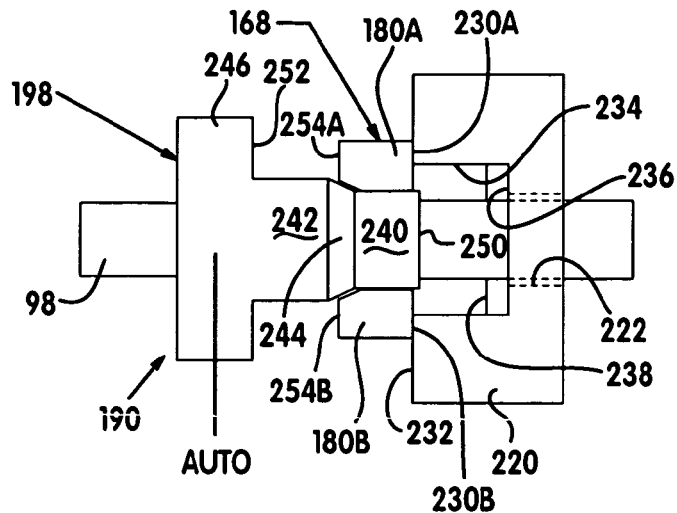
FIGS. 9A, 9B and 9C are views taken generally along directional lines X-X shown in each of corresponding FIGS. 8A, 8B and 8C for illustrating various components of the mode shift mechanism.

Thus, ends 180A and 180B are biased to their first or retracted position (see FIG. 9A) for causing drag band 168 to maintain its circumferential drag force on upper rim 174 of actuator ring 166. Therefore, initial rotation of rear output shaft 18 and front output shaft 32 caused by motive operation of the motor vehicle results in circumferential indexing of actuator ring 166 relative to slipper ring 120 until lug 178 engages one of end surfaces 146 or 148 within actuation slot 144.

Figure 10A:
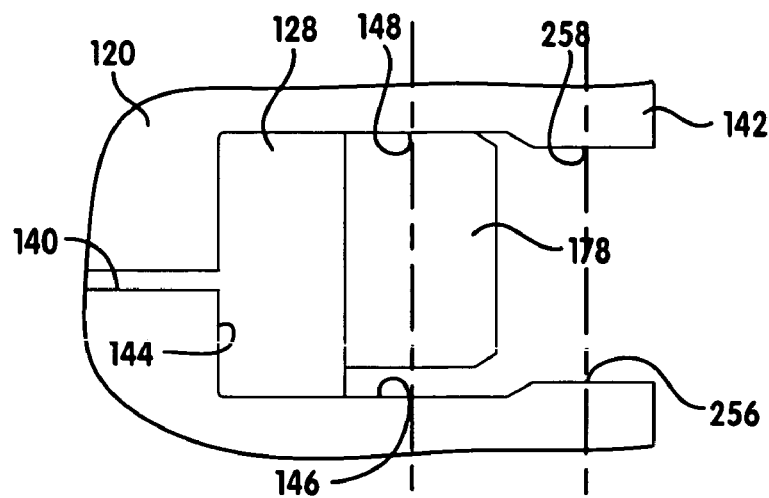
FIGS. 10A, 10B and 10C are views taken generally along directional line Y-Y shown in each of corresponding FIGS. 8A, 8B and 8C for illustrating components of the mode clutch assembly.

For example, if the vehicle is rolling forward, second sprocket 114 will rotate in a first direction and the drag exerted by drag band 168 will cause actuator ring 166 to index in a first direction until lug 178 engages end surface 148, as seen in FIG. 10A. In this position, lug 178 prevents rotation of slipper ring 120 in a first direction relative to inner hub 118 while permitting limited rotation of slipper ring 120 in a second direction relative thereto. Since inner hub 118 is driven by rear output shaft 18, mode clutch assembly 58 is maintained in an unlocked condition during relative rotation in the first direction. Specifically, with lug 178 engaging end surface 148 of slipper ring 120 it acts to maintain alignment between slipper ring 120 and inner hub 118 such that rollers 122 are centrally located in cam tracks 132 and 138. As such, slipper ring 120 is released from frictional engagement with second sprocket 114, whereby front output shaft 32 is allowed to overrun rear output shaft 18.

However, if traction is lost at rear wheels 26 and rear output shaft 18 attempts to overrun front output shaft 32, slipper ring 120 moves in the second direction relative to inner hub 118. This limited relative rotation causes rollers 122 to ride up the circumferentially indexed cam tracks 132 and 138 which acts to expand and frictionally clamp slipper ring 120 to hub segment 152 of second sprocket 114, thereby locking mode clutch assembly 58. With mode clutch assembly 58 in its locked condition, drive torque is automatically transferred from rear output shaft 18 through transfer assembly 56 and mode clutch assembly 58 to front output shaft 32. This one-way locking function establishes the on-demand four-wheel high-range drive mode during forward motion of the vehicle since front output shaft 32 is automatically coupled for rotation with rear output shaft 18 in response to lost traction at rear wheels 26. However, once the lost traction condition has been eliminated, the drag force causes actuator ring 166 to again index in the first direction until lug 178 re-engages end surface 148 of slipper ring 120. Thus, mode clutch assembly 58 is released and automatically returns to operation in its unlocked mode. Namely, once the rear wheel slip has been eliminated, slipper ring 120 moves relative to inner hub 118 for locating rollers 122 centrally in cam tracks 132 and 138 to disengage mode clutch assembly 58 until the occurrence of the next lost traction situation.

During reverse motive operation of the vehicle in the on-demand four-wheel high-range drive mode, second sprocket 114 rotates in a second direction and the drag force applied by drag band 168 causes actuator ring 138 to circumferentially index until lug 178 is located adjacent to end surface 146 of slipper ring 120. This arrangement is the reverse of that described for forward operation such that limited relative rotation is permitted between slipper ring 120 and inner hub 118 in the first direction but prevented in the second direction. Thus, operation in the on-demand four-wheel drive mode during reverse travel of the vehicle also permits front output shaft 32 to overrun rear output shat 18 during tight cornering while mode clutch assembly 58 locks to transfer drive torque to front output shaft 32 during lost traction at the rear wheels. As such, once the on-demand four-wheel high-range drive mode is established, it is operational during both forward and reverse travel of the vehicle. Thus, when transfer case 16 is shifted into its on-demand four-wheel high-range drive mode, it permits front drive shaft 44 to overrun rear drive shaft 30 with all drive torque delivered to rear driveline 20. Drive torque is only transferred to front driveline 34 through mode clutch assembly 58 when rear output shaft 18 attempts to overrun front output shaft 32.

Figure 8B:
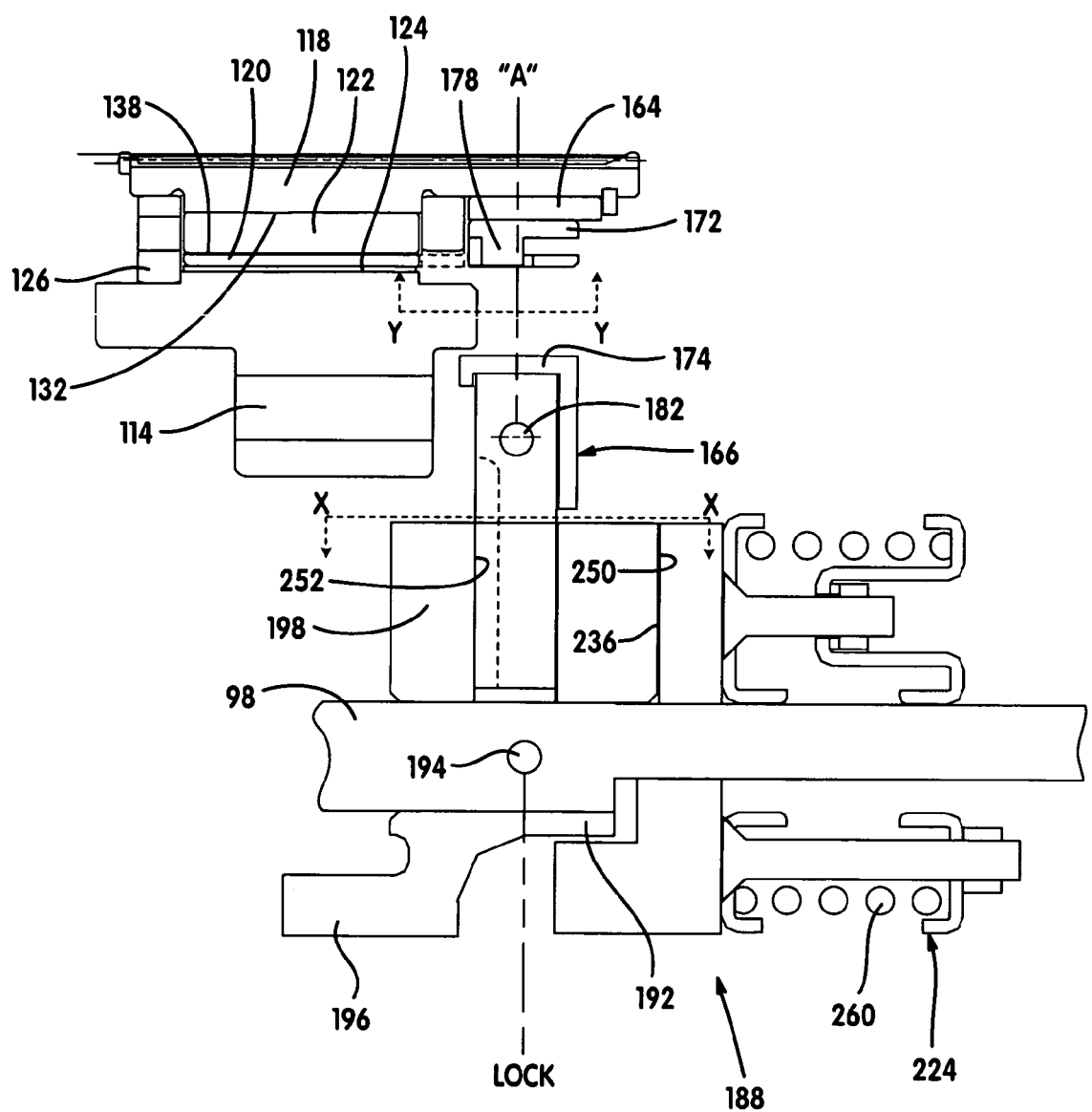
FIG. 8B shows the components of the mode clutch assembly and the mode shift mechanism positioned to establish a locked four-wheel drive mode.
Figure 9B:
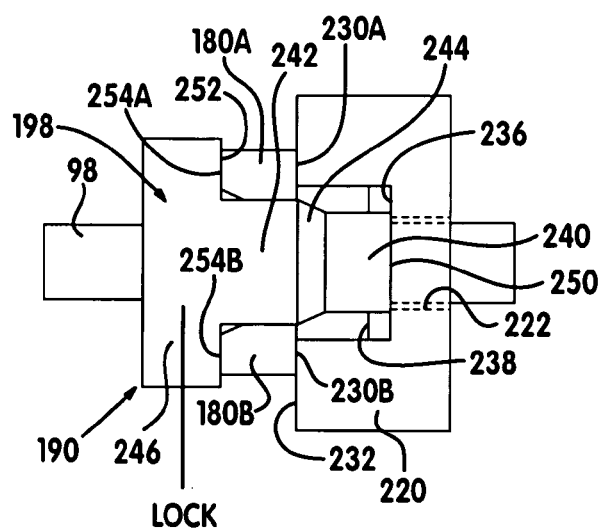
Figure 10B:
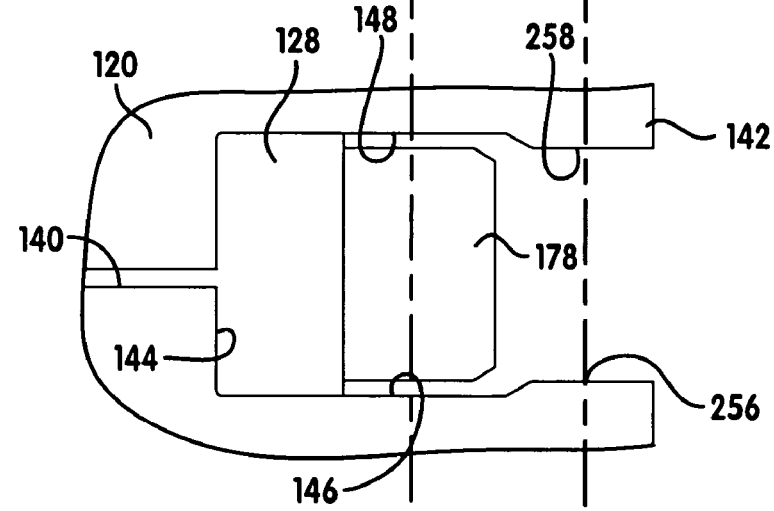

When mode selector 46 indicates selection of the locked four-wheel high-range drive mode, controller 48 commands motor 86 to rotate sector plate 88 until poppet 248 is located in its 4H-LOCK detent position. Such rotation of sector plate 88 causes range follower 94 to continue to travel within dwell segment 92A of cam slot 92 for maintaining range collar 72 in its H range position. Likewise, such rotation of sector plate 88 causes mode follower 200 to continue to travel along first ramp portion 202A of cam surface 202 for forcibly moving mode fork 190 from its AUTO mode position into its second or LOCK mode position, in opposition to the biasing exerted by spring 214 on shift rail 98. Referring to FIGS. 8B, 9B and 10B, movement of mode fork 190 from its AUTO mode position into its LOCK mode position results in drag band ends 180A and 180B being forcibly separated due to their initial engagement with the sides of third cam block 244 and subsequent engagement with the sides of second cam block 242. Such camming action causes ends 180A and 180B of drag band 168 to move from their retracted position (FIG. 9A) to their second or expanded position (FIG. 9B). Movement of drag band ends 180A and 180B to their expanded position, in opposition to the biasing exerted thereon by spring-biased roller pin 182, acts to release the circumferential drag force normally applied to actuator ring 166. In addition, movement of mode fork 190 to its LOCK mode position causes a terminal end surface 250 of first cam block 240 to move into close proximity with shoulder surface 236 in aperture 234 of support plate 220. Likewise, a face surface 252 of drive block 246 is located in close proximity to second or front edge surfaces 254A and 254B of drag band ends 180A and 180B, respectively. However, biasing assembly 224 acts on support plate 220 to maintain actuator ring 166 in its first position.

With drag band 168 released from frictional engagement with upper rim 174 of actuator ring 166 due to movement of mode fork 190 to its LOCK position, radial lug 178 is initially positioned centrally in actuation slot 144 of slipper ring 120, as best shown in FIG. 10B. When centrally located, the opposite edges of lug 178 are displaced from both end surfaces 146 and 148 of actuation slot 114. As such, relative rotation between front output shaft 32 and rear output shaft 18 in either direction (i.e., front overrunning rear or rear overrunning front) causes a limited amount of relative rotation between slipper ring 120 and inner hub 118. Such limited relative movement causes rollers 122 to ride up the circumferentially indexed cam tracks 132 and 138 which, in turn, causes rollers 122 to exert a radially outwardly directed frictional locking force on slipper ring 120, thereby clamping slipper ring 120 to hub segment 152 of second sprocket 114. Accordingly, mode clutch assembly 58 is locked and second sprocket 114 is coupled to rear output shaft 18 such that drive torque is transferred from rear output shaft 18 through transfer assembly 56 to front output shaft 32. In effect, front output shaft 32 is coupled to rear output shaft 18 to establish the locked four-wheel high-range drive mode.

When it is desired to shift transfer case 16 from its locked four-wheel high-range drive mode into its two-wheel high-range drive mode, control unit 48 commands electric motor 86 to rotate sector plate 88 until poppet 248 is located in its 2H detent position. Such rotation of sector plate 88 causes range follower 94 to continue to travel within dwell segment 92A of cam slot 92 for maintaining range collar 72 in its H range position. However, such rotation of sector plate 88 causes mode follower 200 to travel along a second ramp portion 202B of cam surface 202 for causing mode fork 190 to move from its LOCK mode position into its third or RELEASE mode position.

Figure 8C:
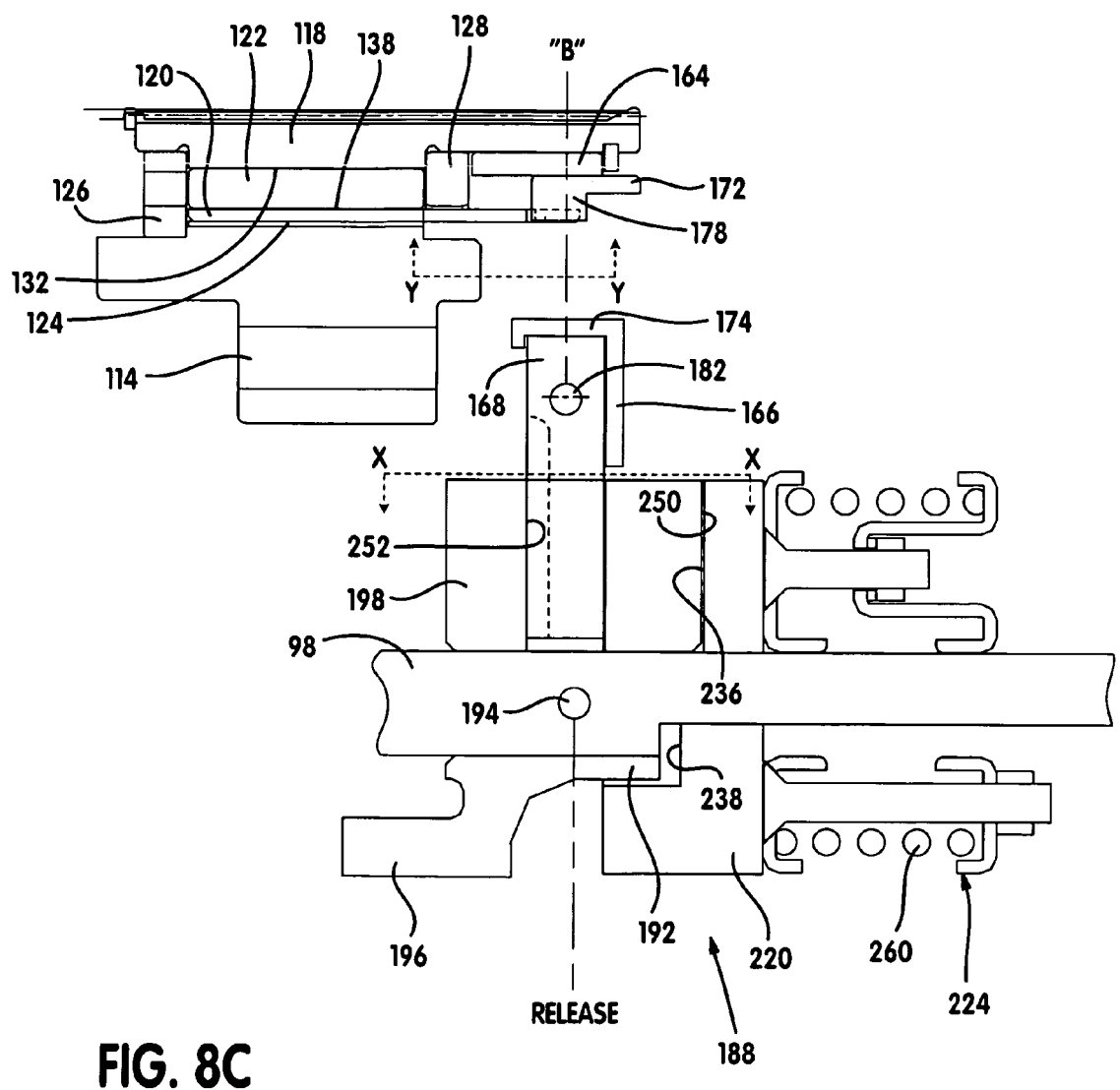
FIG. 8C shows the components of the mode clutch assembly and the mode shift mechanism positioned to establish a two-wheel drive mode.
Figure 9C:
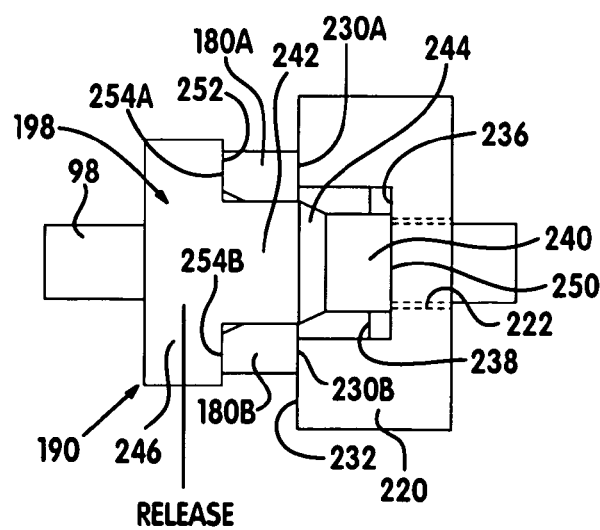
Figure 10C:
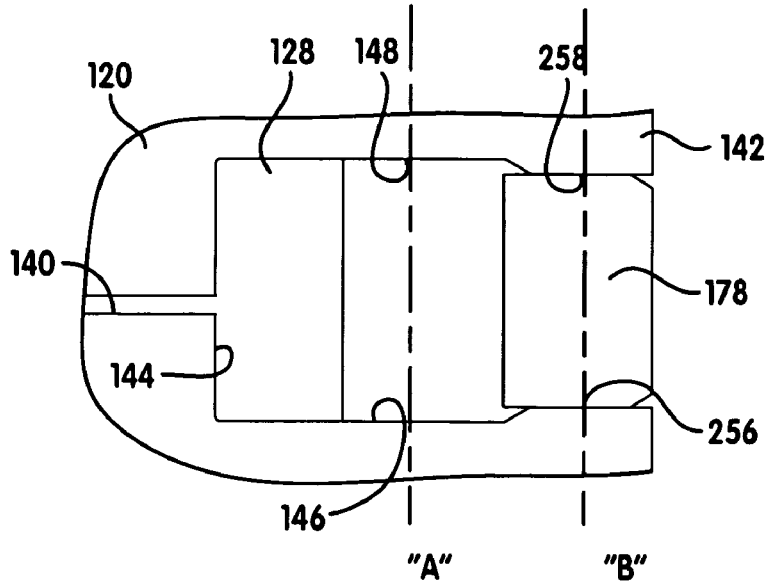

Referring to FIGS. 8C, 9C and 10C, movement of mode fork 190 from its LOCK mode position to its RELEASE mode position acts to maintain drag band ends 180A and 180B in engagement with second cam block 242. Specifically, ends 180A and 180B are maintained in their expanded position for continuing to release the frictional drag force on actuator ring 166. However, the engagement of end surface 250 on first cam block 240 with shoulder surface 236 of support plate 220 and the engagement of drive block surface 252 with edge surfaces 254A and 254B of drag band 168 causes actuator ring 166 to slide on support sleeve 164 from its first position to its second position, as denoted by position line "B", in response to movement of mode fork 190 from its LOCK mode position into its RELEASE mode position. Such sliding movement of actuator ring 166 is opposed by the biasing force exerted on support plate 220 by biasing assembly 224. As seen, the concurrent movement of support plate 220 with that of mode fork 190 causes coil spring 260 to compress. In addition, such translational movement of actuator ring 166 causes its lug 178 to enter into a narrowed portion of actuation slot 144 that is bounded by end surfaces 256 and 258. In fact, lug 178 is located in close proximity to end surfaces 256 and 258 so as to prevent relative rotation between slipper ring 120 and inner ring 118 in both directions, thereby maintaining mode clutch assembly 58 in its unlocked condition in both directions. As such, overrunning is permitted in both directions of relative rotation between output shafts 18 and 32 with no drive torque transferred to front output shaft 32.

When it is desired to shift transfer case 16 from its two-wheel high-range drive mode into its neutral mode, the mode signal from mode selector 46 is sent to controller 48 which then commands electric motor 86 to rotate sector plate 88 until poppet assembly 248 is located in its N detent. Such rotation of sector plate 88 causes range follower 94 to exit high-range dwell section 92A of range slot 92 and travel within a shift section 92B thereof. The contour of shift section 92B causes range fork 76 to move axially which, in turn, causes corresponding movement of range collar 72 from its H position to its N position. Concurrently, mode follower 200 exits second ramp portion 202B and travels along a dwell portion 202C of cam surface 202 which is contoured to maintain mode fork 190 in its RELEASE mode position.

When mode selector 46 indicates selection of the part-time four-wheel low-range drive mode, sector plate 88 is rotated until poppet assembly 248 is located in its 4L-LOCK detent position. Assuming the shift sequence requires continued rotation of sector plate 88 in the same direction, range follower 94 continues to travel within shift section 92B of range slot 92 for causing axial movement of range collar 72 from its N position to its L position. Concurrently, mode follower 200 exits dwell portion 202C of cam surface 202 and travels along a third cam portion 202D thereof which is configured to permit biasing assembly 224 to move mode fork 190 from its RELEASE mode position back to its LOCK mode position. Specifically, a coil spring 260 applies a return force on support plate 220 for forcibly moving actuator ring 166 from its second position (FIG. 8C) back to its first position FIGS. 8A and 8B) concurrent with return of mode fork 190 to its LOCK position. As previously described, locating mode fork 190 in its LOCK mode position causes a bi-directional locking of mode clutch assembly 58 for establishing the locked four-wheel low-range drive mode.

Transfer case 16 has been described as permitting selection of a two-wheel drive mode via mode selector 46. However, transfer case 16 can optionally be arranged to utilize the two-wheel drive mode as a means for automatically releasing engagement of mode clutch 58 in response to detection of a braking situation so as to improve vehicle stability control. For example, in a two-speed version of transfer case 16, mode selector 46 could permit selection of the on-demand four-wheel high-range drive mode, the locked four-wheel high-range drive mode, the Neutral mode and the locked four-wheel low-range drive mode. In such an arrangement, sector plate 88 would be rotated to the corresponding detent position (i.e., 4H-AUTO, 4H-LOCK, N and 4L-LOCK) required to establish the desired drive mode. However, upon detection of a vehicle braking situation, controller 48 would command motor 86 to rotate sector plate 88 to its 2H detent position, thereby releasing engagement of mode clutch 58. Thereafter, sector plate 88 would be rotated back to the desired detent position for re-establishing the previously selected drive mode.

Figure 11:
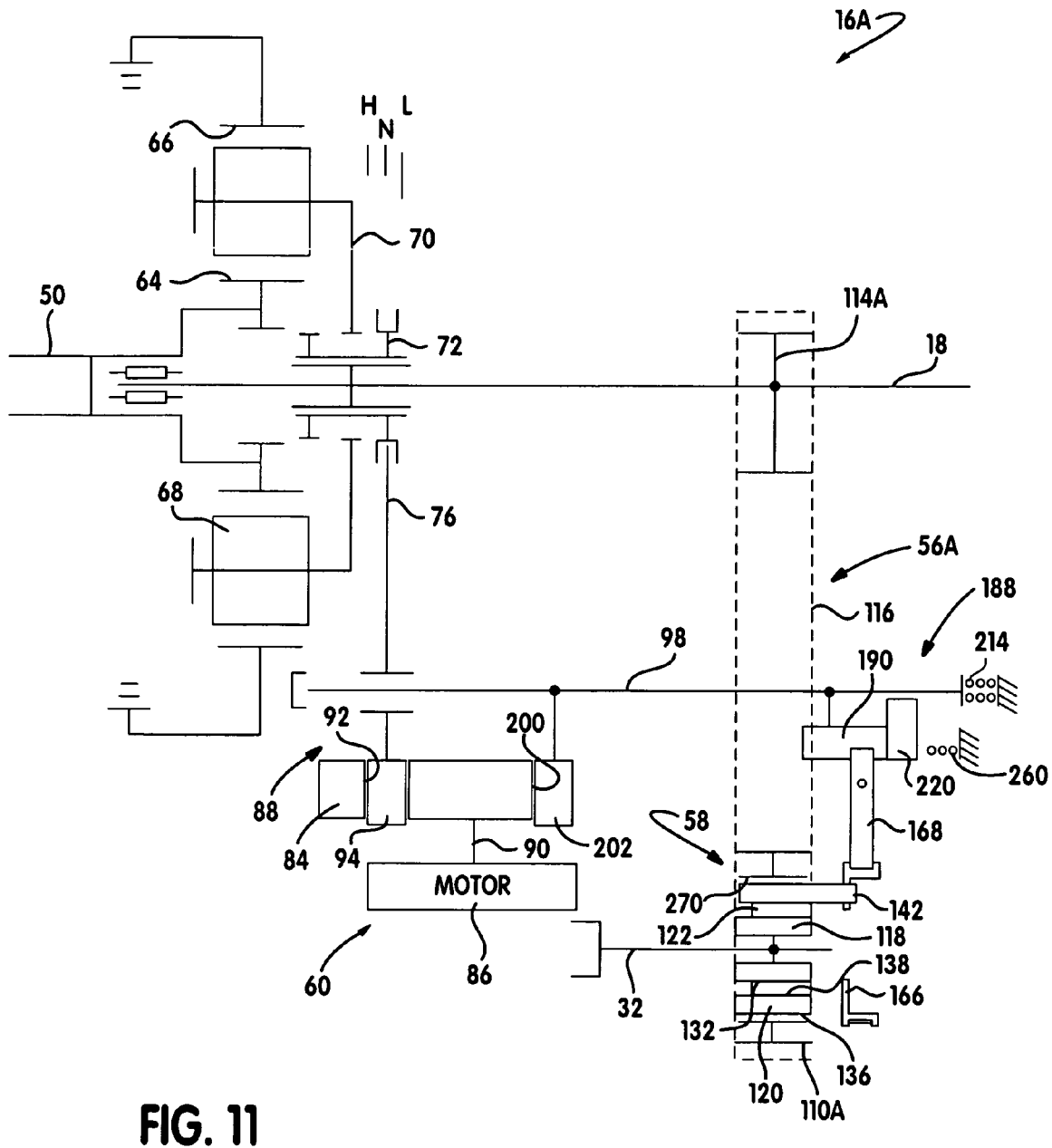
FIG. 11 schematically illustrates an alternative arrangement for the mode clutch assembly in the transfer case.
Figure 12:
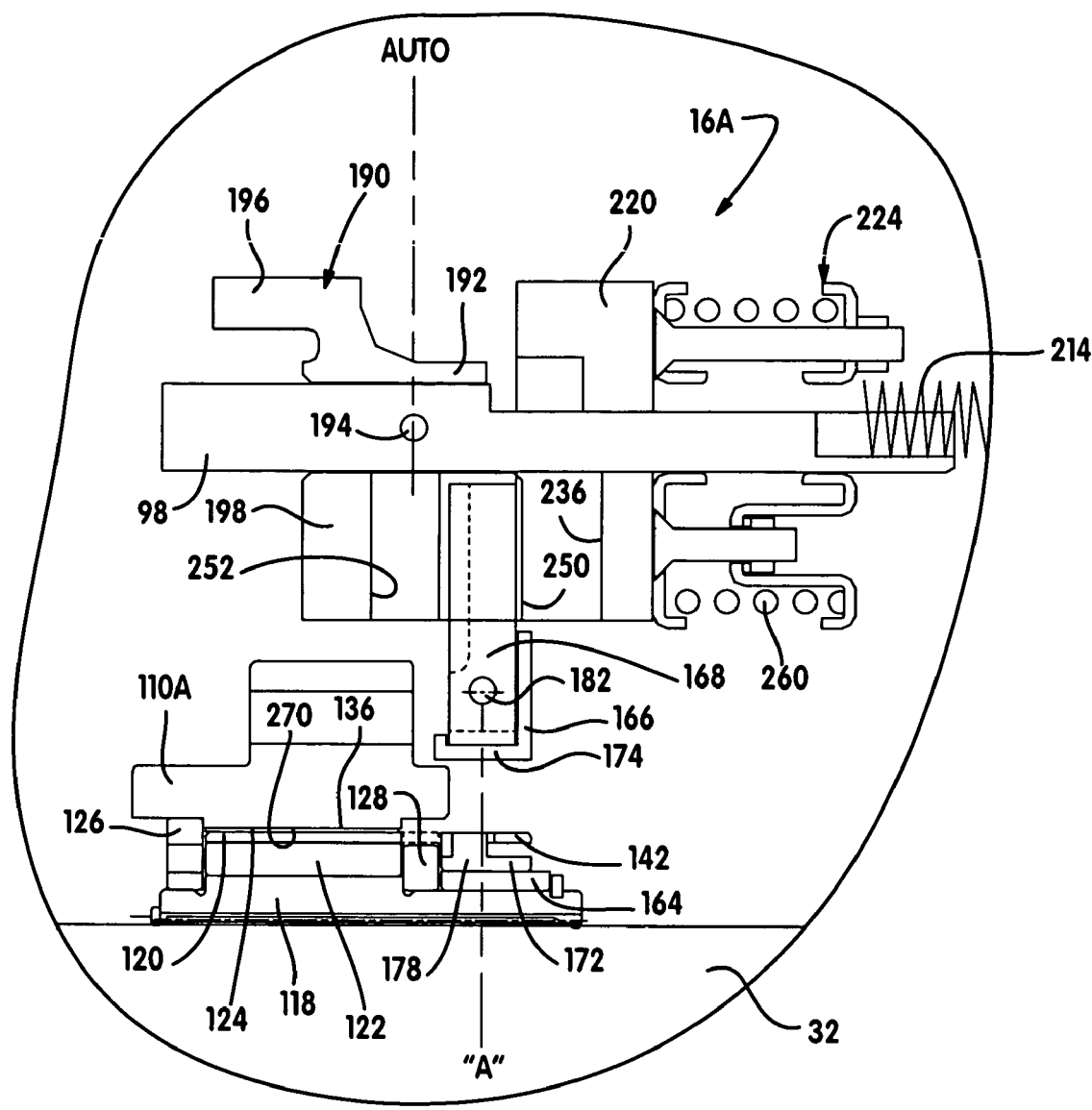
FIG. 12 is a partial sectional view illustrating the mode clutch assembly in association with the front output shaft of the transfer case shown in FIG. 11.

Referring to FIGS. 11 and 12, a transfer case 16A is shown which is a revised version of transfer case 16. For brevity, common components are identified by the same reference numerals used previously to identify components of transfer case 16. In this particular arrangement, mode clutch 58 is shown located on front output shaft 32 and is operable for coupling first sprocket 110A to front output shaft 32. As seen, second sprocket 114A is fixed for driven rotation with rear output shaft 18 such that chain 116 drives first sprocket 110A. Inner hub 118 is fixed (i.e., splined) to front output shaft 32 and defines a plurality of cam tracks 132 while slipper ring 120 also defines a plurality of cam tracks 138. As before, rollers 122 are disposed between inner hub 118 and slipper ring 120 within cam tracks 132 and 138. Friction sleeve 124 (FIG. 12) is disposed between outer surface 136 of slipper ring 120 and an inner surface 270 of first sprocket 11A. Upon mode clutch 58 being shifted into its locked condition, slipper ring 120 frictionally clamps first sprocket 110A to inner hub 118, thereby transmitting drive torque from rear output shaft 18 through transfer assembly 56A and mode clutch 58 to front output shaft 32.

Mode shift mechanism 188 is again operable to control movement of mode fork 190 between its AUTO, LOCK and RELEASE mode positions in response to controlled rotation of sector plate 88 based on the mode signal sent to controller 48. As before, the on-demand four-wheel drive mode is established with mode fork 190 in its AUTO mode position, the locked four-wheel drive modes are established with mode fork 190 in its LOCK mode position and the two-wheel drive mode is established when mode fork 190 is located in its RELEASE mode position. Shift system 60 is shown with sector plate 88 coordinating movement of range collar 74 between its three distinct range positions with movement of mode fork 190 between its three distinct mode positions to establish the desired operational drive mode.

Figure 13:
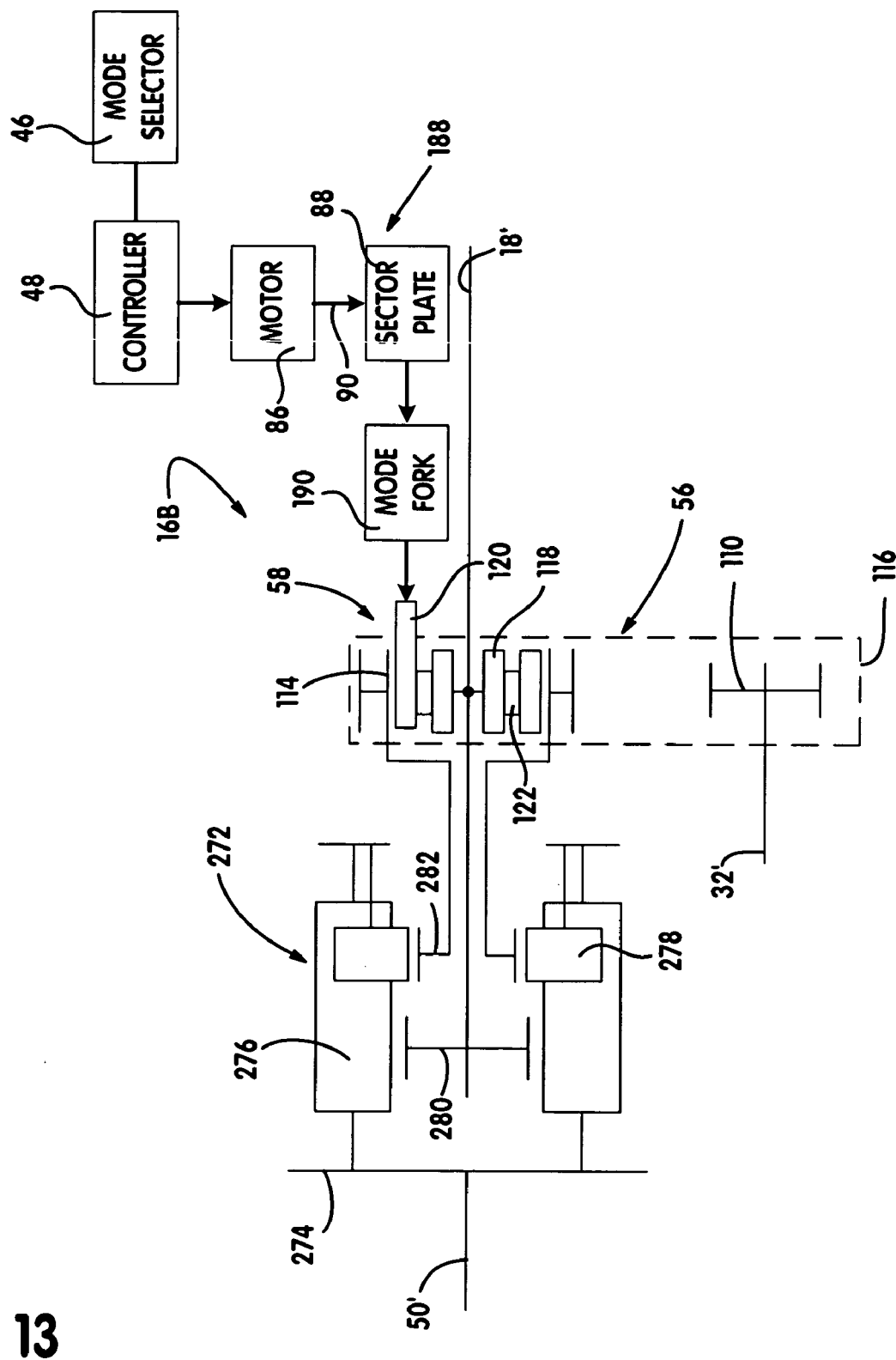
FIG. 13 is a schematic illustration of a single-speed full-time transfer case with the mode clutch assembly disposed between the front and rear outputs of a center differential.

Referring now to FIG. 13, a single-speed, full-time four-wheel drive version of a transfer case 16B is shown to include a center differential 272 operably interconnecting input shaft 50' to rear output shaft 18' and front output shaft 32'. Center differential 272 includes a carrier 274 which rotatably supports meshed pairs of first pinions 276 and second pinions 278. First pinions 276 mesh with a first drive gear 280 that is fixed to rear output shaft 18' while second pinions 278 mesh with a second drive gear 282 that is fixed to second sprocket 114. As seen, second sprocket 114 drives first sprocket 110 via chain 116 for driving front output shaft 32'. In addition, mode clutch 58 is shown to be operably disposed between sprocket 114 and rear output shaft 18' in a manner substantially similar to that shown in FIG. 4, with the primary components of mode shift mechanism 188 identified in block form. Preferably, mode shift mechanism 188 includes the components shown in FIGS. 6 and 8 for controlling movement of mode fork 190 between its AUTO, LOCK and RELEASE mode positions. Mode selector 46 permits selection of at least two drive modes, namely, an automatic full-time four-wheel drive mode and a locked four-wheel drive mode. When the automatic full-time four-wheel drive mode is selected, mode fork 190 is moved to its AUTO mode position. Likewise, selection of the locked four-wheel drive mode results in movement of mode fork 190 to its LOCK mode position. Automatic release of mode clutch 58 in response to detection of a brake situation is accomplished via movement of mode fork 190 to its RELEASE mode position.

Figure 14:
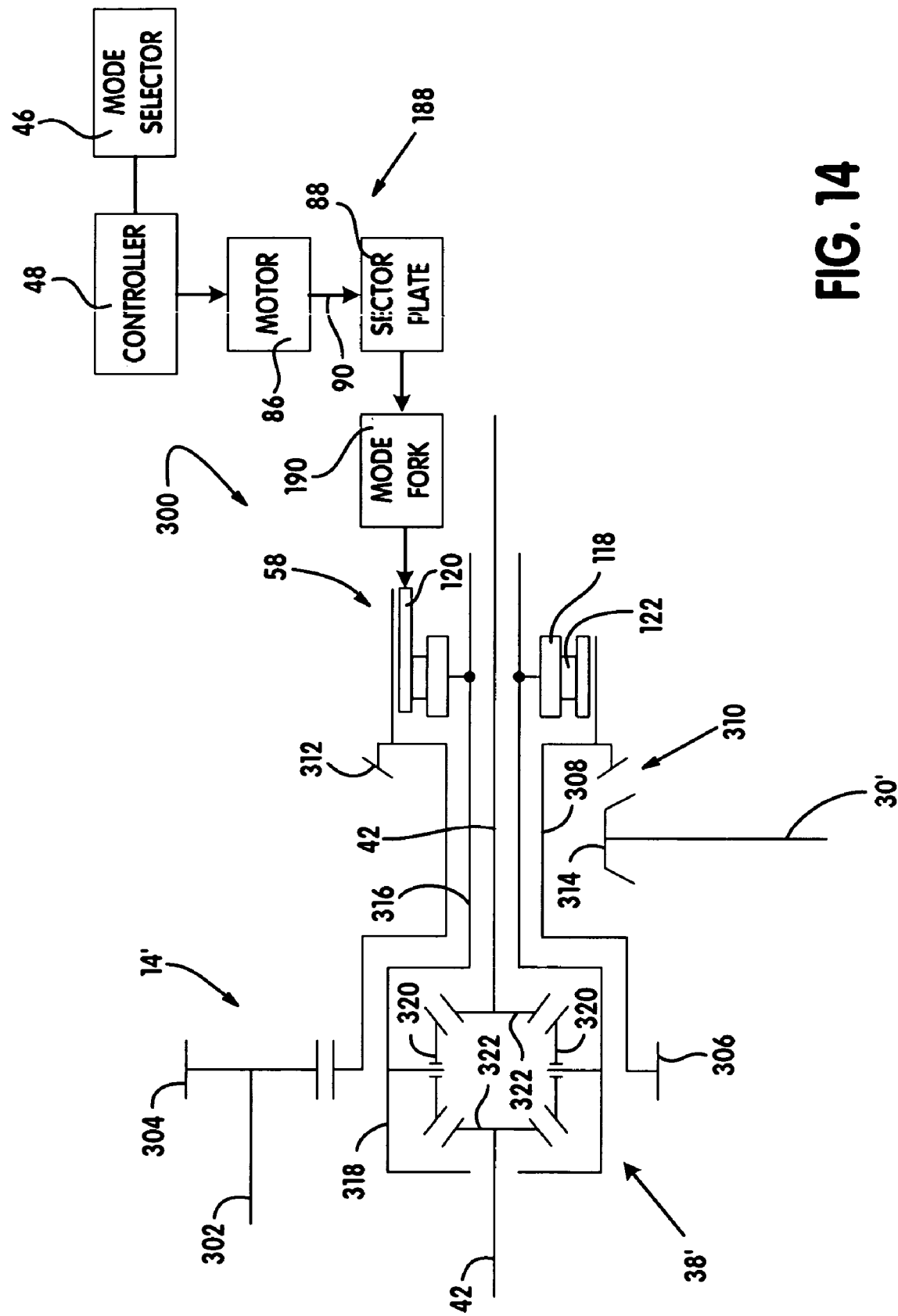
FIGS. 14 and 15 are schematic illustrations of on-demand power take-off units equipped with the mode clutch assembly and the mode shift mechanism of the present invention.

Another type of power transfer device, commonly referred to as a power take-off unit 300, is shown in FIG. 14 for use with a transverse (i.e., east-west) powertrain instead of the longitudinal (i.e., north-south) powertrain shown in FIG. 1. As seen, an output shaft 302 of a transaxle 14' has an output gear 304 driving a drive gear 306 that is fixed to a transfer shaft 308. A right-angled gearset 310 transmits drive torque from transfer shaft 308 to rear drive shaft 30' for normally supplying motive power to rear wheels 26. Gearset 310 is shown to include a ring gear 312 that is meshed with a pinion gear 314 fixed to drive shaft 30'. As seen, mode clutch 58 is arranged to transfer drive torque from transfer shaft 308 through a second transfer shaft 316 to a carrier 318 associated with front differential unit 38'. Differential unit 38' is shown to include pinion gears 320 rotatably supported on pins fixed to carrier 318 and which mesh with first and second side gears 322 that are fixed to front axleshafts 42. In a manner similar to that shown in FIG. 13, mode shift mechanism 188 is again operable to move mode fork 190 between its AUTO, LOCK and RELEASE mode positions for establishing the on-demand and locked four-wheel drive modes and the two-wheel drive mode. In this arrangement, drive torque is normally delivered to the rear driveline but is selectively transferred to the front driveline via actuation of mode clutch 58.

Figure 15:
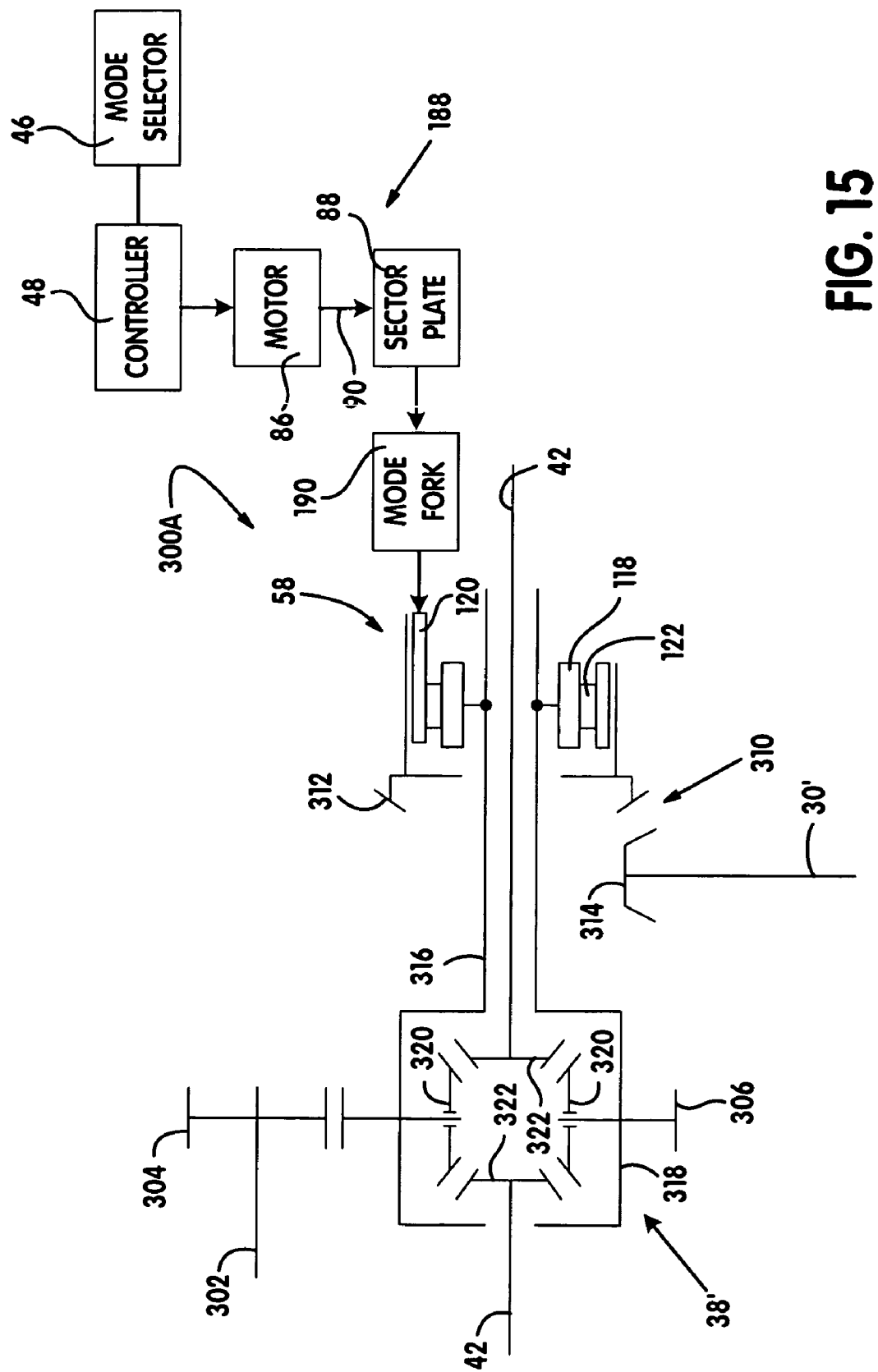

FIG. 15 illustrates a power take-off unit 300A that is generally similar to power take-off unit 300 of FIG. 14 except that drive torque is normally delivered to the front driveline and is only transmitted to the rear driveline via actuation of mode clutch 58. Thus, power take-off unit 300A is used in a front-wheel drive vehicle to provide on-demand and locked four-wheel drive modes wherein drive torque is delivered to the rear wheels. As seen, mode clutch 58 is operably disposed between transfer shaft 316 and ring gear 312.

Figure 16:
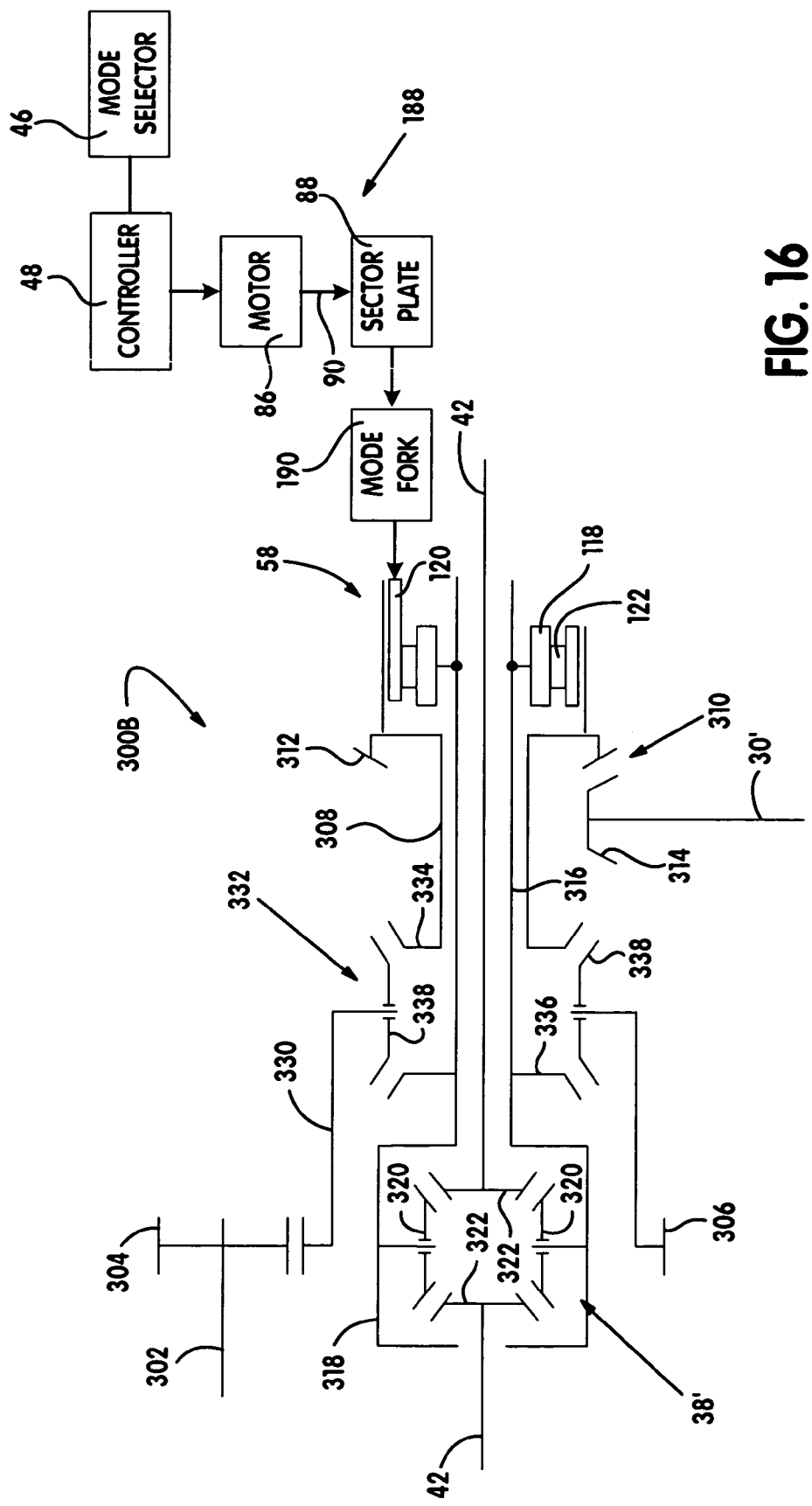
FIG. 16 is a schematic illustration of a full-time power take-off unit.

In addition to the on-demand four-wheel drive power take-off units shown in FIGS. 14 and 15, a full-time four-wheel drive version is shown in FIG. 16 and is identified by reference numeral 300B. In this arrangement, drive gear 306 drives a carrier 330 of a center differential unit 332 having a first side gear 334 fixed to first transfer shaft 308, a second side gear 336 fixed to second transfer shaft 316, and pinion gears 338 rotatably supported from carrier 330 and commonly meshed with side gears 334 and 336. As seen, mode clutch 58 is operably disposed between first transfer shaft 308 and second transfer shaft 316. As similar to operation of full-time transfer case 16B of FIG. 13, mode shift mechanism 188 is again operable to move mode fork 190 between its three distinct mode positions in response to rotation of sector plate 88 due to motor 86 receiving an electric command signal from controller 48.

Preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer device for use in a motor vehicle having a powertrain and first and second drivelines, comprising:
   a first output interconnecting the powertrain to the first driveline;
   a second output connected to the second driveline;
   an overrunning mode clutch operably disposed between said first and second outputs, said mode clutch is operable in a first mode to permit relative rotation between said first and second outputs in a first direction and prevent relative rotation therebetween in a second direction, said mode clutch is operable in a second mode to prevent relative rotation between said first and second outputs in both directions, and said mode clutch is operable in a third mode to permit relative rotation between said first and second output in both directions, said mode clutch including a first ring driven by one of said first and second outputs, a second ring operably disposed between said first ring and the other of said first and second outputs and having an actuation slot, rollers engaging a cam surface formed between said first and second rings and an actuator ring having a lug retained in said actuation slot, said actuator ring is operable in a first actuator position to permit movement of said lug into engagement with one of first and second end surfaces of said actuation slot, and said actuator ring is operable in a second actuator position to locate said lug in engagement with both of said first and second end surfaces of said actuator slot;
   a mode shift mechanism operable in a first mode position to shift said mode clutch into its first mode, in a second mode position to shift said mode clutch into its second mode and in a third mode position to shift said mode clutch into its third mode; and
   a shift system for moving said mode shift mechanism between its first, second and third mode positions.

2. The power transfer device of claim 1 wherein said mode shift mechanism is operable in its first mode position to cause a drag member to exert a drag force on said actuator ring in its first actuator position, wherein said mode shift mechanism is operable in its second mode position to cause said drag member to release said drag force from said actuator ring in its first actuator position, and wherein said mode shift mechanism is operable in its third mode position to release said drag force while causing movement of said actuator ring from its first actuator position to its second actuator position.

3. The power transfer device of claim 1 wherein said shift system includes an electric motor having a rotary output and a drive mechanism for converting bi-directional rotary motion of said motor output into bi-directional translational motion of said mode shift mechanism between its three distinct mode positions.

4. The power transfer device of claim 3 further comprising:
   a control system having a mode selector capable of generating a mode signal indicative of the mode selected; and
   a control unit receiving said mode signal and actuating said motor in response thereto for moving said mode shift mechanism to its mode position corresponding to the selected mode.

5. The power transfer device of claim 1 defining a transfer case with a first output shaft as its first output and a second output shaft as its second output, and further including a transfer unit driven by said first output shaft with said mode clutch operably disposed between said transfer unit and said second output shaft.

6. The power transfer device of claim 1 defining a power take-off unit having a right-angled drive unit as its first output and a transfer shaft driving a differential associated with the second driveline as its second output, and wherein said mode clutch is operably disposed between said drive unit and said transfer shaft.

7. The power transfer device of claim 1 defining a power take-off unit having differential carrier of a differential unit associated with the first driveline as its first output and a right-angled drive unit as its second output, and wherein said mode clutch is operably disposed between said differential carrier and said drive unit.

8. The power transfer device of claim 1 defining a power take-off unit having a first differential unit, a drive unit as its first output and a second differential unit as its second output, said first differential unit including an input member driven by the powertrain, a first output gear driving said drive unit and a second output gear driving said second differential unit, and wherein said mode clutch is operably disposed between said first and second output gears of said first differential unit.

9. A transfer case for use in a four-wheel drive motor vehicle having a powertrain and first and second drivelines, comprising:
   a first shaft for transmitting drive torque from the powertrain to the first driveline;
   a second shaft for transmitting drive torque to the second driveline;
   a transfer unit driving said second output shaft;
   a bi-directional overrunning mode clutch operable for transmitting drive torque from said first shaft to said transfer unit, said mode clutch including a first ring coupled for rotation with said first shaft and having first cam tracks, a second ring disposed between said first ring and said transfer unit and having second cam tracks, rollers disposed within aligned pairs of said first and second cam tracks, and an actuator ring supported for translational movement between a first actuator position and a second actuator position, said actuator ring having a lug disposed within an actuation slot formed in said second ring;
   a mode shift mechanism moveable between first, second and third mode positions, said mode shift mechanism is operable in its first mode position to locate said actuator ring in its first actuator position and permit movement of said lug from a central position into engagement with one of first and second end surfaces of said actuation slot so as to establish an on-demand four-wheel drive mode, said mode shift mechanism is operable in its second mode position to locate said actuator ring in its first actuator position and inhibit movement of said lug into engagement with either of said first and second end surfaces of said actuation slot so as to establish a locked four-wheel drive mode, and wherein said mode shift mechanism is operable in its third mode position to locate said actuator ring in its second actuator position and position said lug in engagement with both of said end surfaces of said actuation slot so as to establish a two-wheel drive mode, and a shift system for moving said mode shift mechanism between its three distinct mode positions.

10. The transfer case of claim 9 wherein said shift system comprises:
   a drive mechanism coupled to said mode shift mechanism;
   a power-operated actuator for causing said drive mechanism to move said mode shift mechanism;
   a mode selector for permitting selection of at least said on-demand four-wheel drive mode and said locked four-wheel drive mode and generating a mode signal indicative of the drive mode selected; and
   a control unit for receiving said mode signal and controlling actuation of said power-operated actuator for moving said mode shift mechanism to its first mode position when said on-demand four-wheel drive mode is selected and moving said mode shift mechanism to its second mode position when said locked four-wheel drive mode is selected.

11. The transfer case of claim 10 wherein said mode selector further permits selection of said two-wheel drive mode which causes said control unit to command said power-operated actuator to move said mode shift mechanism to its third mode position.

12. The transfer case of claim 10 wherein said control unit is further operable to cause said mode select mechanism to be moved from either of its first or second mode positions into its third mode position in response to detection of a braking condition.

13. The transfer case of claim 9 further comprising:
   a third shaft driven by the powertrain; and
   a center differential having an input driven by said third shaft, a first output connected to said first shaft and a second output connected to said transfer unit.

14. A transfer case for use in a four-wheel drive motor vehicle having a powertrain and first and second drivelines, comprising:
   a first shaft for transmitting drive torque from the powertrain to the first driveline;
   a second shaft for transmitting drive torque to the second driveline;
   a transfer unit driven by said first shaft;
   a bi-directional overrunning mode clutch operable for transmitting drive torque from said transfer unit to said second shaft, said mode clutch including a first ring coupled for rotation with said second shaft and having first cam tracks, a second ring disposed between said first ring and said transfer unit and having second cam tracks, rollers disposed within aligned pairs of said first and second cam tracks, and an actuator ring supported for translational movement between a first actuator position and a second actuator position, said actuator ring having a lug disposed within an actuation slot formed in said second ring;
   a mode shift mechanism moveable between first, second and third mode positions, said mode shift mechanism is operable in its first mode position to locate said actuator ring in its first actuator position and permit movement of said lug from a central position into engagement with one of first and second end surfaces of said actuation slot so as to establish an on-demand four-wheel drive mode, said mode shift mechanism is operable in its second mode position to locate said actuator ring in its first actuator position and inhibit movement of said lug into engagement with either of said first and second end surfaces of said actuation slot so as to establish a locked four-wheel drive mode, and wherein said mode shift mechanism is operable in its third mode position to locate said actuator ring in its second actuator position and position said lug in engagement with both of said end surfaces of said slot so as to establish a two-wheel drive mode; and
   a shift system for moving said mode shift mechanism between its three distinct mode positions.

15. The transfer case of claim 14 wherein said shift system comprises:
   a drive mechanism coupled to said mode shift mechanism;
   a power-operated actuator for causing said drive mechanism to move said mode shift mechanism;
   a mode selector for permitting selection of at least said on-demand four-wheel drive mode and said locked four-wheel drive mode and generating a mode signal indicative of the drive mode selected; and
   a control unit for receiving said mode signal and controlling actuation of said power-operated actuator for moving said mode shift mechanism to its first mode position when said on-demand four-wheel drive mode is selected and moving said mode shift mechanism to its second mode position when said locked four-wheel drive mode is selected.

16. The transfer case of claim 15 wherein said mode selector further permits selection of said two-wheel drive mode which causes said control unit to command said power-operated actuator to move said mode shift mechanism to its third mode position.

17. In a four-wheel drive vehicle having a powertrain and first and second sets of wheels, a power transfer unit comprising:
   a first drive mechanism having a first rotary component for transmitting drive torque from the powertrain to a first driveline for driving the first set of wheels;
   a second drive mechanism having a second rotary component for transmitting drive torque to the second pair of wheels;
   a bi-directional overrunning mode clutch operable for transmitting drive torque from said first drive mechanism to said second drive mechanism, said mode clutch includes a first ring fixed for rotation with said first rotary component of said first drive mechanism and having first cam tracks, a second ring disposed between said first ring and said second rotary component of said second drive mechanism and having second cam tracks, rollers disposed within aligned pairs of said first and second cam tracks and an actuator ring supported for translational movement between a first actuator position and a second actuator position and having a lug disposed within an actuation slot formed in said second ring;
   a mode shift mechanism moveable between first, second and third mode positions, said mode shift mechanism is operable in its first mode position to locate said actuator ring in its first actuator position and permit movement of said lug from a central position into engagement with one of first and second end surfaces of said actuation slot so as to establish an on-demand four-wheel drive mode, said mode shift mechanism is operable in its second mode position to locate said actuator ring in its first actuator position and inhibit movement of said lug into engagement with either of said first and second end surfaces of said actuation slot so as to establish a locked four-wheel drive mode, and wherein said mode shift mechanism is operable in its third mode position to locate said actuator ring in its second actuator position and position said lug in engagement with both of said end surfaces of said slot so as to establish a two-wheel drive mode, and a shift system for moving said mode shift mechanism between its three distinct mode positions.

18. The power transfer unit of claim 17 wherein said shift system comprises:
a power-operated actuator for moving said mode shift mechanism;
a mode selector for permitting selection of at least said on-demand four-wheel drive mode and said locked four-wheel drive mode and generating a mode signal indicative of the drive mode selected; and
a control unit for receiving said mode signal and controlling actuation of said power-operated actuator for moving said mode shift mechanism to its first mode position when said on-demand four-wheel drive mode is selected and moving said mode shift mechanism to its second mode position when said locked four-wheel drive mode is selected.

19. The power transfer unit of claim 18 wherein said mode selector further permits selection of said two-wheel drive mode which causes said control unit to command said power-operated actuator to move said mode shift mechanism to its third mode position.

20. The power transfer unit of claim 18 wherein said control unit is further operable to cause said mode select mechanism to be moved from either of its first or second mode positions into its third mode position in response to detection of a braking condition.

21. A power take-off unit for use in a motor vehicle having a powertrain and first and second drivelines, comprising:
a first shaft transmitting drive torque from the powertrain to the first driveline;
a second shaft driving the second driveline;
a bi-directional overrunning mode clutch operably disposed between said first and second shafts, said mode clutch is operable in a first mode to permit relative rotation between said first and second shafts in a first direction and prevent relative rotation therebetween in a second direction, said mode clutch is operable in a second mode to prevent relative rotation between said first and second shafts in both directions and said mode clutch is operable in a third mode to permit relative rotation between said first and second shafts in both directions;
a mode shift mechanism operable in a first mode position to shift said mode clutch into its first mode, in a second mode position to shift said mode clutch into its second mode and in a third mode position to shift said mode clutch into its third mode; and
a shift system for moving said mode shift mechanism to its first mode position to establish an on-demand four-wheel drive mode, to its second mode position to establish a locked four-wheel drive mode, and to its third mode position to establish a two-wheel drive mode.

22. A power transfer device for use in a motor vehicle having a powertrain and first and second drivelines, comprising:
a first rotary member interconnecting the powertrain to the first driveline;
a second rotary member connected to the second driveline;
a mode clutch operably disposed between said first and second rotary members, said mode clutch is operable in a first mode to permit relative rotation between said first and second rotary members in a first direction and prevent relative rotation therebetween in a second direction, said mode clutch is operable in a second mode to prevent relative rotation between said first and second rotary members in both directions, and said mode clutch is operable in a third mode to permit relative rotation between said first and second rotary members in both directions, said mode clutch including a first ring driven by one of said first and second rotary members, a second ring operably disposed between said first ring and the other of said first and second rotary members, rollers engaging a cam surface formed between said first and second rings, and an actuator ring supported for axial movement relative to said second ring between first and second actuator positions;
a mode shift member operable in a first mode position to shift said mode clutch into its first mode, in a second mode position to shift said mode clutch into its second mode and in a third mode position to shift said mode clutch into its third mode; and
a shift system for moving said mode shift member between its first, second and third mode positions.

23. The power transfer device of claim 22 wherein a lug formed on said actuator ring is retained in an actuation slot formed in said second ring, wherein said actuator ring is operable in its first actuator position to permit movement of said lug into engagement with one of first and second end surfaces of said actuation slot, and wherein said actuator ring is operable in its second actuator position to locate said lug in engagement with both of said first and second end surfaces of said actuation slot.

24. The power transfer device of claim 23 wherein said mode shift member is operable in its first mode position to exert a drag force on said actuator ring in its first actuator position, wherein said mode shift member is operable in its second mode position to release said drag force from said actuator ring in its first actuator position, and wherein said mode shift member is operable in its third mode position to release said drag force while causing movement of said actuator ring from its first actuator position to its second actuator position.

25. The power transfer device of claim 23 wherein said shift system includes an electric motor having a rotary output and a drive mechanism for converting bi-directional rotary motion of said motor output into bi-directional translational motion of said mode shift member between its three distinct mode positions.

26. The power transfer device of claim 22 defining a transfer case with a first output shaft as its first rotary member and a second output shaft as its second rotary member, and further including a transfer unit driven by said first output shaft with said mode clutch operably disposed between said transfer unit and said second output shaft.

27. The power transfer device of claim 23 defining a transfer case with a first output shaft as its first rotary member and a second output shaft as its second rotary member, and further comprising a transfer unit driven by said second output shaft with said mode clutch operably disposed between said transfer unit and said first output shaft.

28. The power transfer device of claim 22 defining a power take-off unit having a right-angled drive unit as its first rotary member and a transfer shaft driving a differential associated with the second driveline as its second rotary member, and wherein said mode clutch is operably disposed between said drive unit and said transfer shaft.

29. The power transfer device of claim 22 defining a power take-off unit having differential carrier of a differential unit associated with the first driveline as its first rotary member and a right-angled drive unit as its second rotary member, and wherein said mode clutch is operably disposed between said differential carrier and said drive unit.

30. The power transfer device of claim 22 defining a power take-off unit having a first differential unit, a drive unit as its first rotary member and a second differential unit as its second rotary member, said first differential unit including an input member driven by the powertrain, a first output gear driving said drive unit and a second output gear driving said second differential unit, and wherein said mode clutch is operably disposed between said first and second output gears of said first differential unit.

31. A power transfer device for use in a motor vehicle having a powertrain and first and second drivelines, comprising:

a differential having an input driven by the powertrain and first and second outputs;

a first rotary member connecting said first output to the first driveline;

a second rotary member connecting said second output to the second driveline;

a mode clutch operable in a first mode to permit relative rotation between said first and second rotary members in a first direction and prevent relative rotation therebetween in a second direction to establish an automatic four-wheel drive connection between the powertrain and said first and second rotary members, said mode clutch is operable in a second mode to prevent relative rotation between said first and second rotary members in both directions to establish a locked four-wheel drive connection between the powertrain and said first and second rotary members, and said mode clutch is operable in a third mode to permit relative rotation between said first and second rotary members in both directions to establish an open four-wheel drive connection between the powertrain and said first and second rotary members; and a mode shift mechanism operable in a first mode position to shift said mode clutch into its first mode, in a second position to shift said mode clutch into its second mode, and in a third mode position to shift said mode clutch into its third mode.

* * * * *